United States Patent
Ishihara et al.

(10) Patent No.: US 9,863,124 B2
(45) Date of Patent: Jan. 9, 2018

(54) CONSTRUCTION MACHINERY

(71) Applicant: Hitachi Construction Machinery Co., Ltd., Bunkyo-ku, Tokyo (JP)

(72) Inventors: Shinji Ishihara, Tokyo (JP); Masatoshi Hoshino, Tokyo (JP); Kazuo Fujishima, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 200 days.

(21) Appl. No.: 14/777,781

(22) PCT Filed: May 20, 2014

(86) PCT No.: PCT/JP2014/063391
§ 371 (c)(1),
(2) Date: Sep. 17, 2015

(87) PCT Pub. No.: WO2014/189062
PCT Pub. Date: Nov. 27, 2014

(65) Prior Publication Data
US 2016/0289923 A1    Oct. 6, 2016

(30) Foreign Application Priority Data

May 24, 2013    (JP) .................................. 2013-110051

(51) Int. Cl.
*E02F 9/20*    (2006.01)
*F15B 21/14*    (2006.01)
(Continued)

(52) U.S. Cl.
CPC ............ *E02F 9/2075* (2013.01); *B60K 6/485* (2013.01); *B60W 20/13* (2016.01); *E02F 9/2091* (2013.01);
(Continued)

(58) Field of Classification Search
CPC ..... E02F 9/2075; E02F 9/2091; E02F 9/2296; E02F 9/2095; E02F 9/2217; E02F 3/31;
(Continued)

(56) References Cited

U.S. PATENT DOCUMENTS 7,086,226 B2 *    8/2006    Oguri .................... E02F 9/2075
                                                                                  60/414
8,257,213 B2 *    9/2012    Komada ................... B60K 6/36
                                                                                  475/5
(Continued)

FOREIGN PATENT DOCUMENTS

JP    2002-275945 A    9/2002
JP    2003-329012 A    11/2003
(Continued)

OTHER PUBLICATIONS

International Search Report (PCT/ISA/210) dated Jul. 22, 2014 with English-language translation (four (4) pages).

*Primary Examiner* — Karen Beck
(74) *Attorney, Agent, or Firm* — Crowell & Moring LLP

(57) ABSTRACT

To provide construction machinery capable of more efficiently utilizing the energy of return hydraulic oil from a hydraulic actuator. The present invention is provided with: an engine 11; a hydraulic pump 12 that is driven by the engine 11; a hydraulic actuator 17 that is driven by fluid discharged from the hydraulic pump 13; a discharge pressure sensor 12d that detects the discharge pressure from the hydraulic pump 13; a hydraulic regenerative motor 18 that is driven by the return hydraulic oil from the hydraulic actuator 17; a flow meter 18e that detects the flow rate of the return hydraulic oil; a flow dividing valve 50 that controls the rate of inflow to the hydraulic regenerative motor 18; a controller 15 that controls the flow dividing valve 50 according to the discharge pressure detected by the discharge pressure sensor 12d and the flow rate detected by the flow
(Continued)

meter 18e; a regenerative generator 19 that generates electric power by being driven by the power of the hydraulic regenerative motor 18; and a motor generator 13 that assists drive of the engine 11 by the electric power supplied from the regenerative generator 19.

11 Claims, 14 Drawing Sheets

(51) Int. Cl.
    *E02F 9/22*           (2006.01)
    *B60W 20/13*         (2016.01)
    *B60K 6/485*         (2007.10)
    *E02F 3/32*          (2006.01)

(52) U.S. Cl.
    CPC .......... *E02F 9/2095* (2013.01); *E02F 9/2217* (2013.01); *E02F 9/2296* (2013.01); *F15B 21/14* (2013.01); *B60W 2300/17* (2013.01); *B60Y 2200/412* (2013.01); *E02F 3/32* (2013.01); *F15B 2211/20515* (2013.01); *F15B 2211/20546* (2013.01); *F15B 2211/41554* (2013.01); *F15B 2211/426* (2013.01); *F15B 2211/611* (2013.01); *F15B 2211/6306* (2013.01); *F15B 2211/6309* (2013.01); *F15B 2211/6323* (2013.01); *F15B 2211/6326* (2013.01); *F15B 2211/7058* (2013.01); *F15B 2211/763* (2013.01); *F15B 2211/88* (2013.01); *Y10S 903/903* (2013.01)

(58) Field of Classification Search
    CPC ... B60K 6/485; B60W 20/13; B60W 2300/17; B60W 1/20515; B60W 2211/6306; B60W 2211/6309; B60W 2211/426; B60Y 2200/412; Y10S 903/903
    USPC ........................................................ 180/53.4
    See application file for complete search history.

(56) References Cited

U.S. PATENT DOCUMENTS

| | | | |
|---|---|---|---|
| 9,284,718 B2* | 3/2016 | Hijikata | E02F 9/2091 |
| 2002/0125052 A1* | 9/2002 | Naruse | B60K 6/12 |
| | | | 180/53.8 |
| 2003/0221339 A1* | 12/2003 | Naruse | E02F 9/2217 |
| | | | 37/348 |
| 2009/0077837 A1 | 3/2009 | Tozawa et al. | |
| 2009/0288408 A1 | 11/2009 | Tozawa et al. | |
| 2011/0251746 A1* | 10/2011 | Wu | B60K 6/48 |
| | | | 701/22 |
| 2013/0300128 A1 | 11/2013 | Fujishima et al. | |
| 2014/0137548 A1 | 5/2014 | Imura et al. | |

FOREIGN PATENT DOCUMENTS

| | | |
|---|---|---|
| JP | 2004-11168 A | 1/2004 |
| JP | 2005-325883 A | 11/2005 |
| JP | 2006-336306 A | 12/2006 |
| JP | 2006-336846 A | 12/2006 |
| JP | 2009-287344 A | 12/2009 |
| JP | 4396906 B2 | 1/2010 |
| JP | 2013-24387 A | 2/2013 |
| WO | WO 2012/105345 A1 | 8/2012 |

\* cited by examiner

FIG. 3

| ELECTRIC POWER AMOUNT SUPPLIED TO MOTOR GENERATOR | ELECTRICAL STORAGE REMAINING AMOUNT ≥ SET VALUE | ELECTRICAL STORAGE REMAINING AMOUNT < SET VALUE |
|---|---|---|
| PUMP OUTPUT − REGENERATIVE POWER ≥ FIRST THRESHOLD VALUE | REGENERATIVE POWER PORTION | REGENERATIVE POWER PORTION |
| PUMP OUTPUT − REGENERATIVE POWER < FIRST THRESHOLD VALUE | PUMP OUTPUT PORTION ONLY | PUMP OUTPUT PORTION ONLY |

| LIMIT OF REGENERATIVE POWER (UPPER LIMIT VALUE) | ELECTRICAL STORAGE REMAINING AMOUNT ≥ SET VALUE | ELECTRICAL STORAGE REMAINING AMOUNT < SET VALUE |
|---|---|---|
| PUMP OUTPUT − REGENERATIVE POWER ≥ FIRST THRESHOLD VALUE | NO LIMITATION | NO LIMITATION |
| PUMP OUTPUT − REGENERATIVE POWER < FIRST THRESHOLD VALUE | PUMP OUTPUT | CHARGEABLE AMOUNT + PUMP OUTPUT |

| ELECTRIC POWER AMOUNT SUPPLIED TO CAPACITOR | ELECTRICAL STORAGE REMAINING AMOUNT ≥ SET VALUE | ELECTRICAL STORAGE REMAINING AMOUNT < SET VALUE |
|---|---|---|
| PUMP OUTPUT − REGENERATIVE POWER ≥ FIRST THRESHOLD VALUE | 0 | 0 |
| PUMP OUTPUT − REGENERATIVE POWER < FIRST THRESHOLD VALUE | 0 | CHARGEABLE AMOUNT |

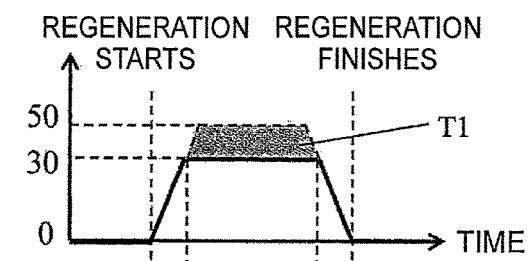
FIG. 8A  REGENERATIVE POWER [kW]
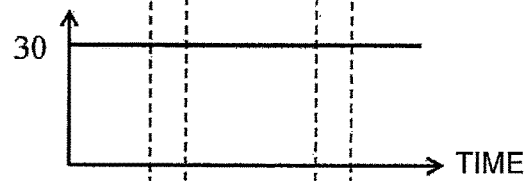
FIG. 8B  PUMP OUTPUT [kW]
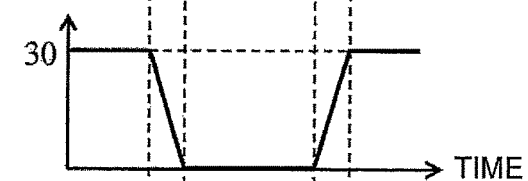
FIG. 8C  ENGINE POWER [kW]
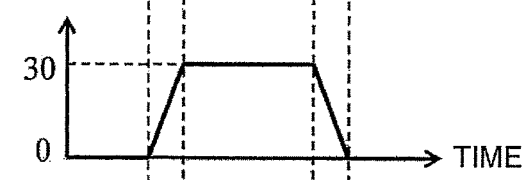
FIG. 8D  ASSISTING POWER [kW]
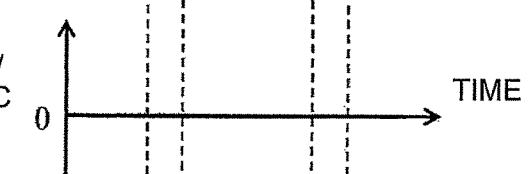
FIG. 8E  CAPACITOR CHARGE/ DISCHARGE ELECTRIC POWER [kW]
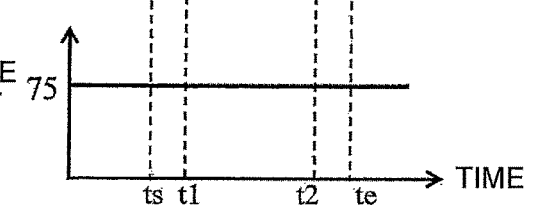
FIG. 8F  ELECTRICAL STORAGE REMAINING AMOUNT [%]

FIG. 9A REGENERATIVE POWER [kW]
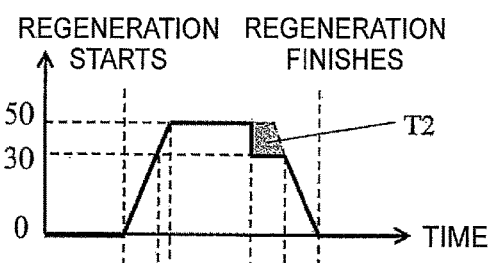
FIG. 9B PUMP OUTPUT [kW]
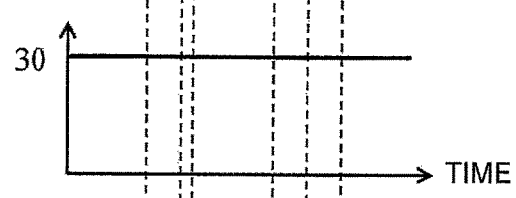
FIG. 9C ENGINE POWER [kW]
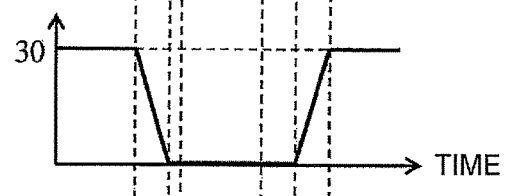
FIG. 9D ASSISTING POWER [kW]
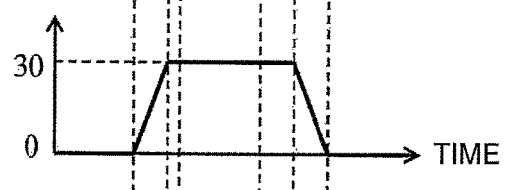
FIG. 9E CAPACITOR CHARGE/ DISCHARGE ELECTRIC POWER [kW]
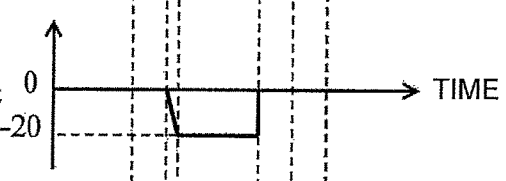
FIG. 9F ELECTRICAL STORAGE REMAINING AMOUNT [%]
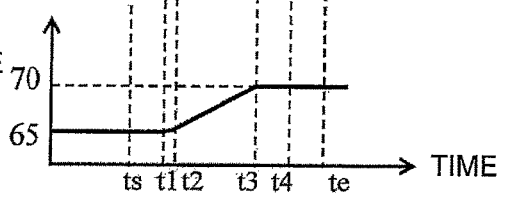

FIG. 11A REGENERATIVE POWER [kW]
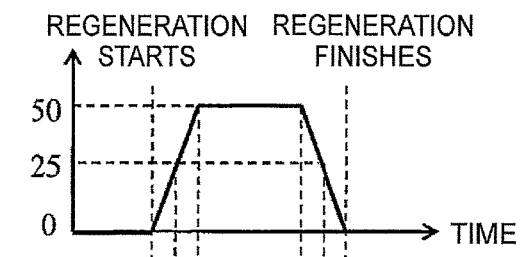
FIG. 11B PUMP OUTPUT [kW]
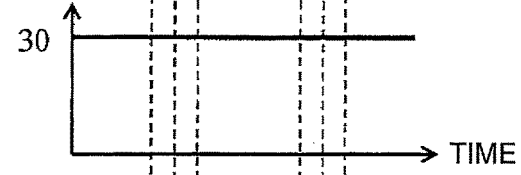
FIG. 11C ENGINE POWER [kW]
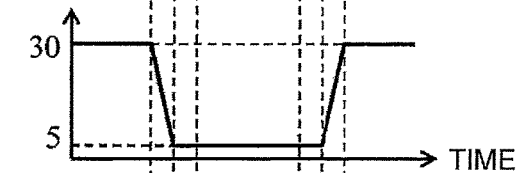
FIG. 11D ASSISTING POWER [kW]
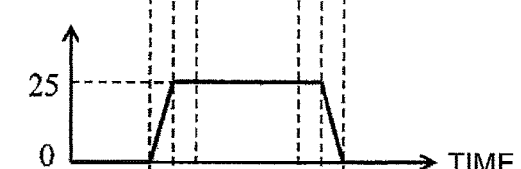
FIG. 11E CAPACITOR CHARGE/DISCHARGE ELECTRIC POWER [kW]
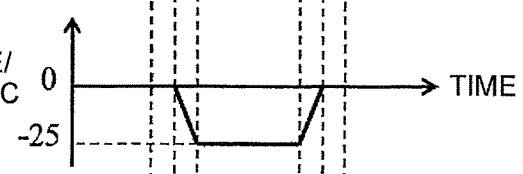
FIG. 11F ELECTRICAL STORAGE REMAINING AMOUNT [%]
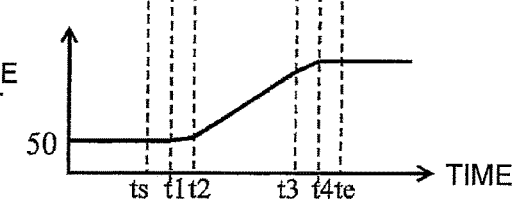

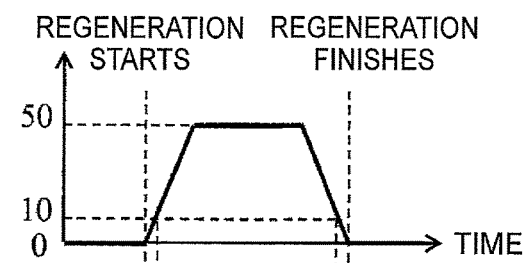
FIG. 16A  REGENERATIVE POWER [kW]
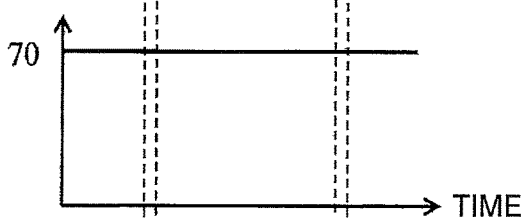
FIG. 16B  PUMP OUTPUT [kW]
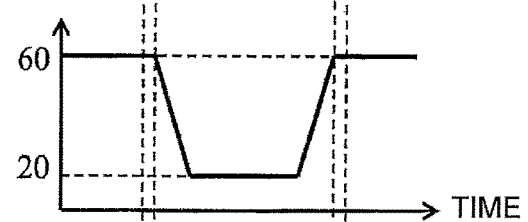
FIG. 16C  ENGINE POWER [kW]
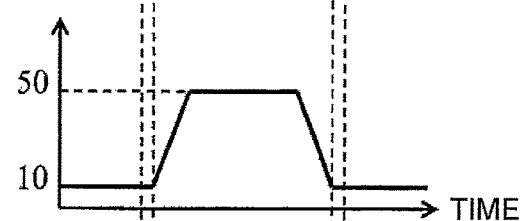
FIG. 16D  ASSISTING POWER [kW]
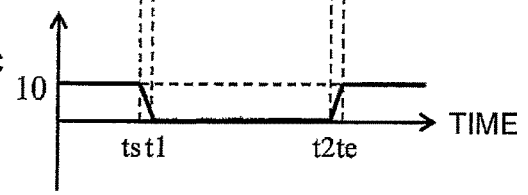
FIG. 16E  CAPACITOR CHARGE/ DISCHARGE ELECTRIC POWER [kW]

CONSTRUCTION MACHINERY

TECHNICAL FIELD

The present invention relates to construction machinery such as a hydraulic excavator for example, and relates particularly to construction machinery including a fluid pressure motor that is driven by a return fluid from a fluid pressure drive device.

BACKGROUND ART

In recent years, in the construction machinery such as the hydraulic excavator of this kind, with the aims of energy saving (lowering the fuel efficiency) and reducing the amount of the exhaust gas (carbon dioxide, nitrogen oxide, particulate matter, and the like for example) discharged from the engine and having the environmental load, so-called hybrid type construction machinery has been proposed in which a motor generator is made a power source in addition to an engine.

Also, a prior art on the hybrid type construction machinery of this type has been disclosed in Patent Literature 1. According to this Patent Literature 1, a hydraulic pump is driven by an engine, a hydraulic cylinder is driven by the pressure oil discharged from this hydraulic pump, and a generator for regeneration is driven by the pressure oil discharged from this hydraulic cylinder. More specifically, the generator for regeneration is driven by the energy which the pressure oil discharged from the hydraulic cylinder has, the motor generator is driven by the electric power generated by drive of this generator for regeneration to assist the engine, to be utilized for drive of the hydraulic pump, and to supply the electric power generated by the generator for regeneration to the battery for charging to be reused.

CITATION LIST

Patent Literature

Patent Literature 1: Japanese Patent No. 4396906

SUMMARY OF INVENTION

Technical Problems

According to the prior art disclosed in Patent Literature 1 described above, the generator for regeneration is driven by the hydraulic oil returned from the hydraulic cylinder to the hydraulic oil tank for power generation, and the electric power generated by drive of this generator for regeneration is supplied to the motor generator, is supplied to the capacitor, and is reused. In other words, in this Patent Literature 1, the supply destination of the electric power generated by the generator for regeneration is switched to either the motor generator or the capacitor.

Therefore, when the electric power generated by drive of this generator for regeneration is supplied to the motor generator to assist the engine, the supply amount of the electric power to this motor generator should be properly controlled, and in the case the supply amount of the electric power to this motor generator is excessively much and so on, over revolution may possibly occur in the engine to be assisted. Also, when the electric power generated in drive of this generator for regeneration is supplied to the capacitor for charging, because the electric power charged to this capacitor is discharged and utilized, the electric power loss by charging and discharging is involved, and it is not easy to efficiently utilize the energy of the pressure oil discharged from the hydraulic cylinder.

The present invention has been developed in view of the actual situation in the prior art described above, and its object is to provide construction machinery that can utilize the energy of the return fluid from a fluid pressure drive device more efficiently.

Solution to Problems

In order to achieve this object, the present invention includes a drive source, a fluid pressure pump driven by the drive source, a fluid pressure drive device driven by fluid discharged from the fluid pressure pump, a discharge pressure detection device that detects the discharge pressure from the fluid pressure pump, a fluid pressure motor driven by a return fluid from the fluid pressure drive device, at least one or more flow rate detection device that detects the flow rate of the return fluid from the fluid pressure drive device, a flow rate control device that controls the flow rate of fluid flowing into the fluid pressure motor, a control device that controls the flow rate control device based on the discharge pressure detected by the discharge pressure detection device and the flow rate detected by the flow rate detection device, a generator that is driven by the power of the fluid pressure motor and generates electric power, and a motor generator that assists drive of the drive source by electric power supplied from the generator.

According to the present invention configured thus, the control device detects the discharge pressure from the fluid pressure pump by the discharge pressure detection device, detects the flow rate of the return fluid from the fluid pressure drive device by the flow rate detection device, controls the flow rate control device from the discharge pressure detected by the discharge pressure detection device and the flow rate of the fluid detected by the flow rate detection device, and controls the flow rate of the fluid flowing into the fluid pressure motor. Therefore, because the energy of the return fluid from the fluid pressure drive device can be properly utilized according to the motion of the construction machinery as the regenerative power by controlling the flow rate of the fluid flowing into the fluid pressure motor according to the discharge pressure of the fluid pressure pump and the flow rate of the return fluid from the fluid pressure drive device, the energy of the return fluid can be utilized more efficiently from the fluid pressure drive device.

Also, the present invention is characterized in that, in the invention described above, the control device includes an energy calculation unit that calculates energy of the return fluid based on the flow rate of the fluid detected by the flow rate detection device, a pump output calculation unit that calculates the output of the fluid pressure pump outputted from the fluid pressure pump based on a detection value from the discharge pressure detection device, and a regeneration control calculation unit that calculates a command signal that controls the flow rate control device according to comparison between difference of the output of the fluid pressure pump calculated by the pump output calculation unit and the energy calculated by the energy calculation unit and a predetermined first threshold value set beforehand.

According to the present invention configured thus, the control device includes the regeneration control calculation unit that compares the difference between the energy or the regenerative power calculated by the energy calculation unit that calculates the energy of the return fluid and the output of the fluid pressure pump calculated by the pump output calculation unit that executes calculation based on the output of the fluid pressure pump outputted from the fluid pressure pump and the first threshold value, and controls the flow rate control device based on the comparison result, and therefore the return fluid can be properly controlled to the fluid pressure motor according to the motion of the construction machinery.

Also, the present invention is characterized in that, in the invention described above, when the difference between the output of the fluid pressure pump calculated by the pump output calculation unit and the energy calculated by the energy calculation unit is equal to or greater than the first threshold value, the control unit controls the flow rate control device so that all of the return fluid from the fluid pressure drive device flows into the fluid pressure motor based on the command signal calculated by the regeneration control calculation unit, and supplies the electric power generated by the generator to the motor generator.

According to the present invention configured thus, the flow rate control device is controlled so that all of the return fluid from the fluid pressure drive device flows into the fluid pressure motor and the electric power generated by the generator is supplied to the motor generator when the difference between the pump output calculated by the pump output load calculation unit and the energy or the regenerative power calculated by the energy calculation unit is equal to or greater than the predetermined first threshold value. In other words, when the energy of the return fluid from the fluid pressure drive device can be utilized for assisting drive of the drive source, this energy of the return fluid from the fluid pressure drive device can be preferentially utilized for assisting drive of the drive source.

Also, the present invention, in the invention described above, includes an electrical storage device that is electrically connected to the motor generator and the generator, is supplied with the electric power generated by the generator, and stores the electric power, wherein the control device includes an electrical storage remaining amount calculation unit that calculates the electrical storage remaining amount of the electrical storage device, and, when the difference between the output of the fluid pressure pump calculated by the pump output calculation unit and the energy calculated by the energy calculation unit is less than the first threshold value and the electrical storage remaining amount calculated by the electrical storage remaining amount calculation unit is less than a predetermined set value, the control device controls the flow rate control device so that all of the return fluid from the fluid pressure drive device flows into the fluid pressure motor based on the command signal calculated by the regeneration control calculation unit, supplies the electric power corresponding to the output of the fluid pressure pump calculated by the pump output calculation unit out of the electric power generated by the generator to the motor generator, and supplies the remaining electric power to the electrical storage device.

According to the present invention configured thus, the flow rate control device is controlled so that all of the return fluid from the fluid pressure drive device flows into the fluid pressure motor when the difference between the pump output calculated by the pump output calculation unit and the energy calculated by the energy calculation unit is less than the first threshold value and the electrical storage remaining amount calculated by the electrical storage remaining amount calculation unit is less than the predetermined set value. Also, the electric power corresponding to the pump output calculated by the pump output calculation unit out of the electric power generated by the generator is supplied to the motor generator, and the remaining electric power is supplied to the electrical storage device. As a result, the energy of the return fluid from the fluid pressure drive device can be utilized preferentially for assisting drive of the drive source by the motor generator, the remaining electric power not supplied to this motor generator can be supplied to the electrical storage device for electrical storage, and therefore the energy of the return fluid from the fluid pressure drive device can be utilized more effectively.

Also, the present invention, in the invention described above, includes an electrical storage device that is electrically connected to the motor generator and the generator, is supplied with the electric power generated by the generator, and stores the electric power, wherein when the difference between the output of the fluid pressure pump calculated by the pump output calculation unit and the energy calculated by the energy calculation unit is less than the first threshold value and the electrical storage remaining amount calculated by the electrical storage remaining amount calculation unit is equal to or greater than the set value, the control device controls the flow rate of the fluid flowing into the fluid pressure motor by the flow rate control device so that the electric power generated by the generator becomes equal to or less than the power corresponding to the output portion of the fluid pressure pump calculated by the pump output calculation unit based on the command signal calculated by the regeneration control calculation unit, and supplies the electric power generated by the generator to the motor generator.

According to the present invention configured thus, the flow rate of the fluid flowing in to the fluid pressure motor is controlled by the flow rate control device so that the electric power generated by the generator becomes equal to or less than the power corresponding to the portion of the pump output calculated by the pump output calculation unit and all of the electric power generated by the generator is supplied to the motor generator when the difference between the pump output calculated by the pump output calculation unit and the energy calculated by the energy calculation unit is less than the first threshold value and the electrical storage remaining amount calculated by the electrical storage remaining amount calculation unit is equal to or greater than the set value. In other words, because the assisting amount of drive of the drive source by the motor generator can be made equal to or less than the pump output calculated by the pump output calculation unit, excessive assisting of this drive source can be suppressed.

Also, the present invention is characterized in that, in the invention described above, when the return fluid from the fluid pressure drive device is made to flow into the fluid pressure motor in a state electric power is supplied from the electrical storage device to the motor generator, the control device controls the electric power supplied from the electrical storage device to the motor generator according to the energy calculated by the energy calculation unit.

According to the present invention configured thus, when the return fluid from the fluid pressure drive device is made to flow into the fluid pressure motor in a state the electric power is supplied from the electrical storage device to the motor generator, the electric power supplied from the electrical storage device to the motor generator is controlled according to the energy calculated by the energy calculation unit. As a result, because the supply amount of the electric power from the electrical storage device to the motor generator can be properly suppressed corresponding to the energy of the return fluid from the fluid pressure drive device, deterioration of this electrical storage device accompanying charging and discharging can be prevented.

Also, the present invention, in the invention described above, includes an electrical storage device that is electrically connected to the motor generator and the generator, is supplied with the electric power generated by the generator, and stores the electric power, wherein the drive source is an engine, the control device includes an electrical storage remaining amount calculation unit that calculates the electrical storage remaining amount of the electrical storage device, controls the power of the engine according to the rotational speed of the engine, stops supply of the electric power to the motor generator when the rotational speed of the engine becomes equal to or greater than a predetermined second threshold value in a state the electric power generated by the generator is supplied to the motor generator, and controls the flow rate control device so as to stop inflow of the return fluid from the fluid pressure drive device to the fluid pressure motor based on the command signal calculated by the regeneration control calculation unit when the electrical storage remaining amount calculated by the electrical storage remaining amount calculation unit is less than a predetermined set value.

According to the present invention configured thus, supply of the electric power to the motor generator is stopped when the rotational speed of the engine becomes equal to or greater than the second threshold value in a state the electric power generated by the generator is supplied to the motor generator. Therefore, breakage and the like possibly occurring when this rotational speed of the engine excessively increases in a state the electric power generated by the generator is supplied to the motor generator to assist drive of the engine can be prevented. Also, at the same time, the flow rate control device is controlled so as to stop inflow of the return fluid from the fluid pressure drive device to the fluid pressure motor based on the command signal calculated by the regeneration control calculation unit and supply of the electric power to the electrical storage device is stopped when the electrical storage remaining amount calculated by the electrical storage remaining amount calculation unit is less than a predetermined set value. Therefore, supply of the electric power to the motor generator through the electrical storage device can be properly stopped, and breakage and the like possibly occurring when the rotational speed of the engine excessively increases can be prevented.

Also, the present invention is characterized in that, in the invention described above, the drive source is an engine, the control unit stores efficiency characteristics with respect to the power of the engine beforehand, calculates a target rotational speed of the engine according to the efficiency characteristics, calculates a correction value of the power of the engine based on the pump output calculated by the pump output calculation unit and the regenerative power calculated by the energy calculation unit in a state the electric power generated by the generator is supplied to the motor generator, and corrects the target rotational speed of the engine based on the correction value of the power of the engine.

According to the present invention configured thus, the target rotational speed of the engine is calculated according to the efficiency characteristics with respect to the power of the engine. The correction value of the power of the engine is calculated based on the pump output calculated by the pump output calculation unit and the regenerative power calculated by the energy calculation unit in a state the electric power generated by the generator is supplied to the motor generator, and the target rotational speed of the engine is corrected based on the correction value of the power of the engine. As a result, when the power of the engine is to be corrected, efficient rotational speed of the engine can be set as the target rotational speed according to the efficiency characteristics with respect to the power of the engine. Therefore, the fuel consumption amount of this engine can be properly reduced.

Effects of Invention

The present invention is configured that the flow rate control device is controlled based on the discharge pressure of the fluid pressure pump detected by the discharge pressure detection device and the flow rate of the return fluid from the fluid pressure drive device detected by the flow rate detection device and that the flow rate of the fluid flowing into the fluid pressure motor is controlled. With this configuration, according to the present invention, by controlling the flow rate of the fluid flowing into the fluid pressure motor according to the discharge pressure of the fluid pressure pump and the flow rate of the return fluid from the fluid pressure drive device, the energy or the regenerative power of the return fluid from the fluid pressure drive device can be properly utilized according to the motion of the construction machinery. Therefore, the regenerative power of the return fluid can be utilized more efficiently from the fluid pressure drive device. Further, the problems, configurations and effects other than those described above will be clarified by explanation of the embodiments below.

BRIEF DESCRIPTION OF DRAWINGS

FIG. 3 is a table showing the motion of the control device of the hydraulic drive device.

FIGS. 4A-4D are graphs showing the motion in the soil discharging work of the hydraulic excavator; wherein FIG. 4A is the regenerative power, FIG. 4B is the pump output, FIG. 4C is the engine power, and FIG. 4D is the assisting power.

FIGS. 7A-7F are graphs showing the motion of a case the excess portion out of the regenerative power of the hydraulic excavator is charged to a capacitor; wherein FIG. 7A is the regenerative power, FIG. 7B is the pump output, FIG. 7C is the engine power, FIG. 7D is the assisting power, FIG. 7E is the capacitor charge/discharge electric power, and FIG. 7F is the electrical storage remaining amount.

FIGS. 8A-8F are graphs showing the motion in a case the electrical storage remaining amount of the capacitor of the hydraulic excavator is equal to or greater than a set value; wherein FIG. 8A is the regenerative power, FIG. 8B is the pump output, FIG. 8C is the engine power, FIG. 8D is the assisting power, FIG. 8E is the capacitor charge/discharge electric power, and FIG. 8F is the electrical storage remaining amount.

FIGS. 9A-9F are graphs showing the motion in a case the electrical storage remaining amount of the capacitor of the hydraulic excavator is less than a set value; wherein FIG. 9A is the regenerative power, FIG. 9B is the pump output, FIG. 9C is the engine power, FIG. 9D is the assisting power, FIG. 9E is the capacitor charge/discharge electric power, and FIG. 9F is the electrical storage remaining amount.

FIGS. 10A and 10B are graphs showing the relationships between the pump output and the regenerative power of the hydraulic pump of the hydraulic excavator; wherein FIG. 10A is an actual relationship, and FIG. 10B is the relationship calculated by the pump output calculation unit and the regeneration control calculation unit.

FIGS. 11A-11F are graphs in a case the hydraulic excavator executes the boom lowering positioning motion; wherein FIG. 11A is the regenerative power, FIG. 11B is the pump output, FIG. 11C is the engine power, FIG. 11D is the assisting power, FIG. 11E is the capacitor charge/discharge electric power, and FIG. 11F is the electrical storage remaining amount.

FIGS. 15A-15C are graphs showing the motion in the soil discharging work of the hydraulic excavator; wherein FIG. 15A is the regenerative power, FIG. 15B is the engine power, and FIG. 15C is the engine rotational speed.

FIGS. 16A-16E are graphs showing the motion in a case the engine is assisted by the electric power charged to the capacitor of a hydraulic excavator related to the fourth embodiment of the present invention; wherein FIG. 16A is the regenerative power, FIG. 16B is the pump output, FIG. 16C is the engine power, FIG. 16D is the assisting power, and FIG. 16E is the capacitor charge/discharge electric power.

DESCRIPTION OF EMBODIMENTS

Below, embodiments of the present invention will be explained based on the drawings.

First Embodiment

Figure 1:
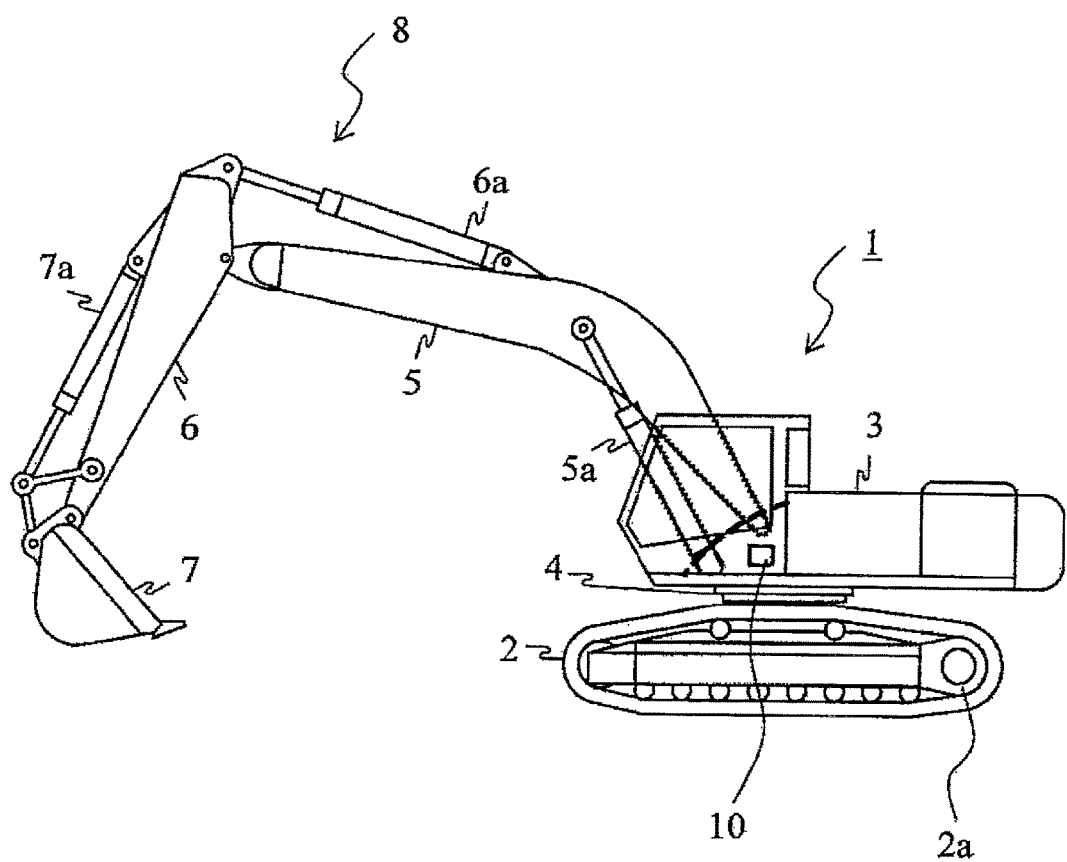
FIG. 1 is a side view of a hydraulic excavator related to the first embodiment of the present invention.
Figure 2:
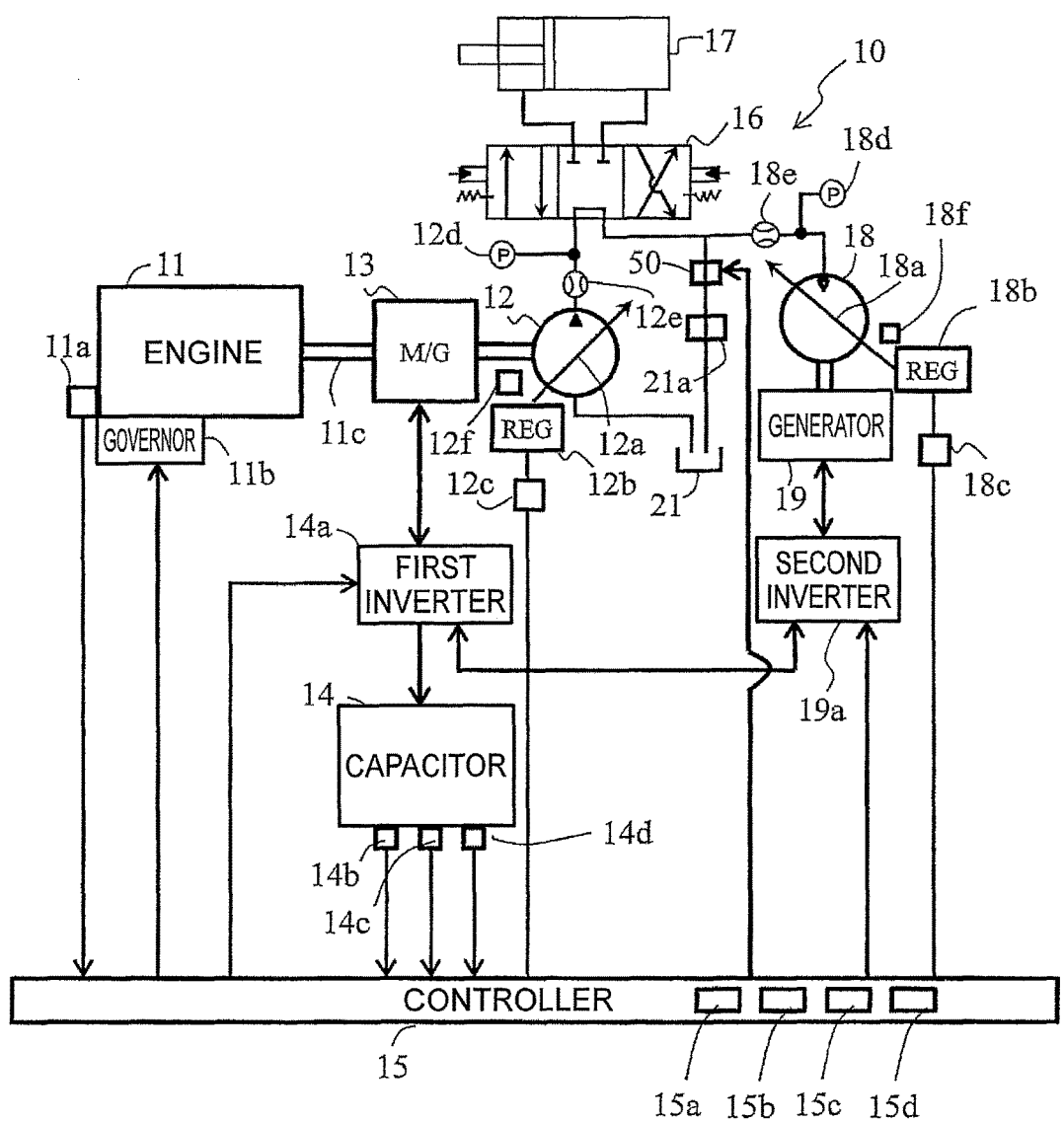
FIG. 2 is a block diagram showing a hydraulic drive device mounted on the hydraulic excavator.
Figure 4A:
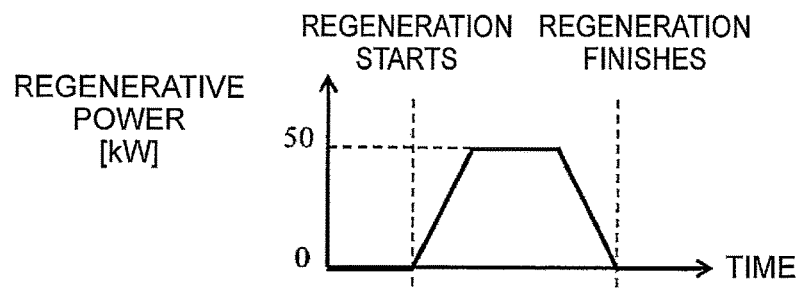
Figure 4B:
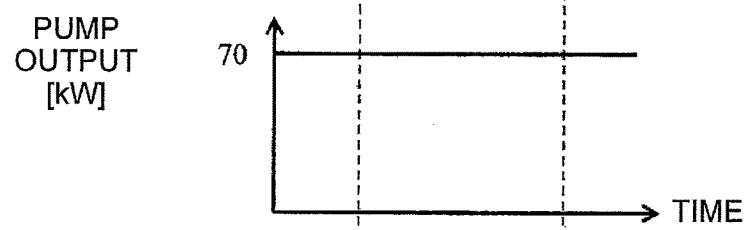
Figure 4C:
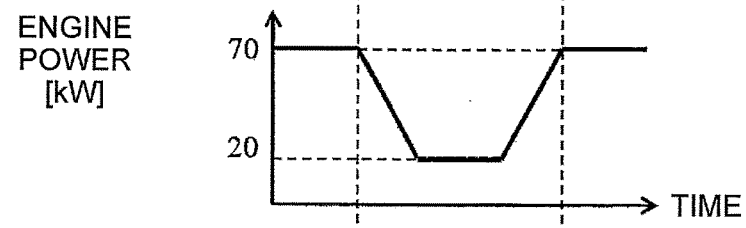
Figure 4D:
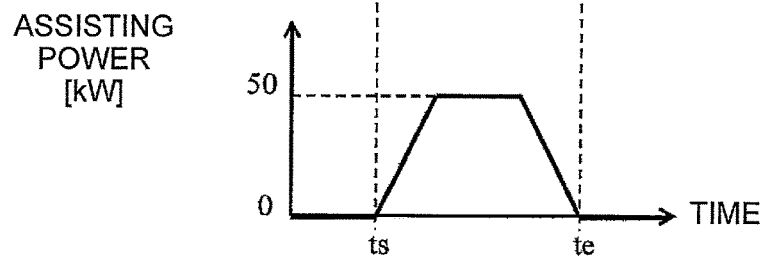

FIG. 1 is a side view of a hydraulic excavator related to the first embodiment of the present invention. FIG. 2 is a block diagram showing a hydraulic drive device mounted on the hydraulic excavator.

FIG. 3 is a table showing the motion of the control device of the hydraulic drive device.

<Configuration>

A hydraulic excavator 1 that is the first embodiment of the construction machinery related to the present invention is an excavator of so-called hybrid type, and includes a lower traveling body 2 including a traveling device 2a of a crawler type, and an upper turning body 3 as a main body turnably attached onto this lower traveling body 2 as shown in FIG. 1. The lower traveling body 2 and the upper turning body 3 are turnably attached to each other through a turning device 4.

To the front side of the upper turning body 3, the base end part of a boom 5 is rotatably attached. The boom 5 is included in a fluid pressure drive device that is driven by hydraulic oil (pressure oil) as a supplied fluid, and is operated through a boom cylinder 5a that is a hydraulic actuator. Also, to the distal end of the boom 5, the base end of an arm 6 is rotatably attached. The arm 6 is included in the fluid pressure drive device that is driven by the hydraulic oil supplied, and is operated through an arm cylinder 6a that is a hydraulic actuator. Further, to the distal end of the arm 6, the base end of a bucket 7 is rotatably attached. The bucket 7 is included in the fluid pressure drive device that is driven by the supplied hydraulic oil, and is operated through a bucket cylinder 7a that is a hydraulic actuator. Also, a front working machine 8 is formed of these boom 5, boom cylinder 5a, arm 6, arm cylinder 6a, bucket 7, and bucket cylinder 7a.

Further, on the upper turning body 3 of the hydraulic excavator 1, a hydraulic drive control device 10 for driving this hydraulic excavator 1 is mounted. The hydraulic drive control device 10 is used for driving the hydraulic actuators of the front working machine 8, the turning device 4, the traveling device 2a, and the like. As shown in FIG. 2, this hydraulic drive control device 10 includes an engine 11 that is a drive source. To the engine 11, a rotational speed sensor 11a that detects the engine rotational speed of this engine 11 and a governor 11b that adjusts the fuel injection amount of this engine 11 are attached. Also, onto a drive shaft 11c of the engine 11, a hydraulic pump 12 of a variable displacement type which is a fluid pressure pump driven by this engine 11 is attached. Between these hydraulic pump 12 and engine 11, a motor generator 13 that is disposed on the drive shaft 11c of this engine 11 and assists drive of this engine 11 is attached.

To the motor generator 13, a capacitor 14 that is an electrical storage device is electrically connected through electric wiring through a first inverter 14a as a motor generator control device. The capacitor 14 is a chargeable/dischargeable battery, capacitor, and the like, and a current sensor 14b that detects the current from this capacitor 14, a voltage sensor 14c that detects the voltage of this capacitor 14, and a temperature sensor 14d that detects the temperature of this capacitor 14 are attached thereto. The first inverter 14a controls the motor generator 13, and supplies/receives the electric power to/from the capacitor 14 and the motor generator 13 according to the necessity. Also, the first inverter 14a includes a switch not illustrated such as a contactor, and can supply/receive the electric power to/from the capacitor 14 by switching on/off the electric power.

To the first inverter 14a, a controller 15 that is a control device controlling the motor generator 13 by controlling this first inverter 14a is electrically connected. The controller 15 controls a governor 11b, adjusts the fuel injection amount to the engine 11, and controls the engine rotational speed. Also, the controller 15 includes an electrical storage remaining amount calculation unit 15a that calculates the electrical storage remaining amount of the capacitor 14 based on the sensor information such as the current, voltage, and temperature detected by the current sensor 14b, the voltage sensor 14c, and the temperature sensor 14d and manages the electrical storage amount of this capacitor 14.

On the other hand, the hydraulic pump 12 supplies discharged pressure oil to a hydraulic actuator 17 that is a fluid pressure drive device through a valve device 16. Here, to this hydraulic actuator 17, various hydraulic actuators of the boom cylinder 5a, the arm cylinder 6a, the traveling device 2a, the turning device 4 and the like shown in FIG. 1 for example correspond.

To the hydraulic pump 12, a first regulator 12b and a first electromagnetic proportional valve 12c which control the tilting angle of a swash plate 12a of this hydraulic pump 12 are attached. Also, to the hydraulic pump 12, a discharge pressure sensor 12d that measures the pressure of the hydraulic oil discharged from this hydraulic pump 12, a flow meter 12e that measures the flow rate of the hydraulic oil discharged from this hydraulic pump 12, and a tilting angle sensor 12f that measures the tilting angle of the swash plate 12a of this hydraulic pump 12 are attached. In the hydraulic pump 12, the first electromagnetic proportional valve 12c inputs the drive signal from the controller 15, the first electromagnetic proportional valve 12c generates the control pressure corresponding to this drive signal using the pressure oil discharged from a pilot pump not illustrated, and outputs the control pressure to the first regulator 12b. The first regulator 12b controls the pump discharge flow rate according to this control pressure and the tilting angle detected by the tilting angle sensor 12f.

In the valve device 16, the opening is adjusted according to an operation signal generated as the operator operating the hydraulic excavator 1 operates an operation device not illustrated, and the pressure oil discharged from the hydraulic pump 12 is controlled to a desired flow rate. Also, the valve device 16 is connected to a pipeline that allows the return hydraulic oil from the hydraulic actuator 17 to flow out to a hydraulic regenerative motor 18 that is a fluid pressure motor, and to a pipeline that branches from this pipeline and allows the return hydraulic oil to flow out to a hydraulic oil tank 21. The hydraulic regenerative motor 18 is driven by the return hydraulic oil that passes through the pipeline for flowing out from the valve device 16 to the hydraulic regenerative motor 18. A regenerative generator 19 that is a generator is mechanically attached to the hydraulic regenerative motor 18, and generates the electric power according to drive of the hydraulic regenerative motor 18. To the regenerative generator 19, a second inverter 19a that controls the electric power generated by this regenerative generator 19 is electrically connected. The second inverter 19a is electrically connected to the first inverter 14a. Also, this second inverter 19a supplies the electric power generated by the regenerative generator 19 to the motor generator 13 through the first inverter 14a, and can assist drive of the engine 11. Further, the flow amount discharged from the hydraulic regenerative motor 18 is returned to a hydraulic oil tank 21 described below through a pipeline not illustrated. Furthermore, although the hydraulic regenerative motor 18 is of a variable capacity type to which a tilting angle sensor 18f that measures the tilting angle of a swash plate 18a and a second regulator 18b and a second electromagnetic proportional valve 18c which control the tilting angle of the swash plate 18a are attached, they are provided for protection such as to determine the tilting angle of the swash plate 18a by the flow rate of the return hydraulic oil and not to increase the rotational speed to equal to or greater than the rated rotational speed that is the specification of the hydraulic regenerative motor 18. Incidentally, the type of hydraulic regenerative motor 18 is not limited to the variable capacity type, and may be a fixed capacity type provided that the flow rate of the return hydraulic oil is supplied within the range of equal to or less than the rated rotational speed.

The pipeline for flowing out from the valve device 16 to the hydraulic oil tank 21 is provided with a flow dividing valve 50 that is a flow rate control device for controlling the flow rate to the hydraulic regenerative motor 18, and a flow meter 21a that is a flow rate detection device that detects the flow rate of the return hydraulic oil to the hydraulic oil tank 21. In the flow dividing valve 50, the valve opening is controlled according to the command signal from the controller 15, and the flow rate of supply to the hydraulic regenerative motor 18 out of the return hydraulic oil from the hydraulic actuator 17 is controlled. The flow meter 21a measures the flow rate passing therethrough, and outputs the flow rate to the controller 15.

The controller 15 includes a pump output calculation unit 15b that calculates the output of the hydraulic pump 12 with respect to the load generated by the hydraulic actuator 17 based on the discharge pressure detected by the discharge pressure sensor 12d and the discharge flow rate value detected by the flow meter 12e.

Also, the pipeline for flowing out from the valve device 16 to the hydraulic regenerative motor 18 is provided with a pressure sensor 18d that measures the pressure of the return hydraulic oil from the hydraulic actuator 17 and a flow meter 18e that is a flow rate detection device measuring the flow rate of the return hydraulic oil.

Further, the controller 15 includes a regenerative power calculation unit 15c that is an energy calculation unit calculating the regenerative power as the energy of the return hydraulic oil from the hydraulic actuator 17 to the hydraulic regenerative motor 18 based on the pressure of the hydraulic oil detected by the pressure sensor 18d and the flow rate value detected by the flow meter 18e. Also, the controller 15 includes a regeneration control calculation unit 15d that controls the flow dividing valve 50 based on the output of the hydraulic pump 12 calculated by the pump output calculation unit 15b and the regenerative power calculated by the regenerative power calculation unit 15c. The regeneration control calculation unit 15d inputs the command value based on the calculated result to the flow dividing valve 50. The flow dividing valve 50 adjusts the valve opening based on the command value, and controls the flow rate of supply to the hydraulic regenerative motor 18. Further, although calculation of the command value is not limited to one method, as an example, such method can be cited that the flow rate value detected by the flow meter 18e or the flow meter 21a is taken into the controller 15, and the command value is calculated so as to follow the target flow rate created separately based on the comparison result between the difference between the output of the hydraulic pump 12 and the regenerative power and the predetermined first threshold value determined beforehand, and so on.

In concrete terms, the controller 15 controls the flow dividing valve 50 to a state the valve opening is closed which is the first state so that all of the return hydraulic oil from the hydraulic actuator 17 is made to flow into the hydraulic regenerative motor 18 or so that all of the regenerative power portion can be absorbed by the hydraulic regenerative motor 18 by the regeneration control calculation unit 15d when the difference between the output of the hydraulic pump 12 calculated by the pump output calculation unit 15b and the regenerative power calculated by the regenerative power calculation unit 15c is equal to or greater than the predetermined first threshold value determined beforehand (output of hydraulic pump 12-regenerative power≥first threshold value) as shown in FIG. 3. Also, the first inverter 14a is controlled so that all of the electric power generated by the regenerative generator 19 is supplied to the motor generator 13 and that supply of the electric power to the capacitor 14 is stopped. Further, the controller 15 controls the flow dividing valve 50 to a state the valve opening is closed which is the first state so that all of the return hydraulic oil from the hydraulic actuator 17 is made to flow into the hydraulic regenerative motor 18 in both of the case the electrical storage remaining amount calculated by the electrical storage remaining amount calculation unit 15a is less than the predetermined set value determined beforehand (electrical storage remaining amount<set value) and the case this electrical storage remaining amount is equal to or greater than the set value (electrical storage remaining amount≥set value). Then, the controller 15 controls the first inverter 14a so that all of the electric power generated by the regenerative generator 19 is supplied to the motor generator 13 to assist drive of the engine 11.

Further, the controller 15 controls the flow dividing valve 50 to a state the valve opening is closed which is the first state so that all of the return hydraulic oil from the hydraulic actuator 17 is made to flow into the hydraulic regenerative motor 18 when the difference between the output of the hydraulic pump 12 and the regenerative power is less than the first threshold value (output of hydraulic pump 12-regenerative power<first threshold value) and the electrical storage remaining amount is less than the set value (electrical storage remaining amount<set value), and controls the first inverter 14a so that the electric power of the portion corresponding to the output of the hydraulic pump 12 out of the electric power generated by the regenerative generator 19 is supplied to the motor generator 13 to preferentially assist the engine, and the remaining excess electric power is supplied to the capacitor 14 for electrical storage.

Also, the controller 15 makes the flow dividing valve 50 to have such valve opening that the electric power generated by the regenerative generator 19 becomes the power corresponding to the output portion of the hydraulic pump 12 or equal to or less than this power which is the second state when the difference between the output of the hydraulic pump 12 and the regenerative power is less than the first threshold value (output of hydraulic pump 12-regenerative power<first threshold value) and the electrical storage remaining amount is equal to or higher than the set value (electrical storage remaining amount≥set value), and controls the flow rate to the hydraulic regenerative motor 18. Then, the controller 15 controls the first inverter 14a so that all of the electric power generated by the regenerative generator 19 is supplied to the motor generator 13 and that supply of the electric power to the capacitor 14 is stopped.

Also, when the engine rotational speed detected by the rotational speed sensor 11a becomes equal to or greater than the predetermined threshold value determined beforehand, the controller 15 determines that the engine 11 has become overspeed, stops supply of the electric power generated by the regenerative generator 19 to the motor generator 13, and stops assisting the engine. Further, when the electrical storage remaining amount is less than the set value, the flow dividing valve 50 is controlled to the valve opening in the third state in which the flow dividing valve 50 is totally open or generally totally open so that the return hydraulic oil from the hydraulic actuator 17 is returned to the hydraulic oil tank 21 by the regeneration control calculation unit 15d and that the hydraulic regenerative motor 18 stops.

<Motion>

Next, with an example of concrete work of the hydraulic excavator 1 related to the first embodiment described above, the motion thereof will be explained. Here, the hydraulic excavator 1 can recover the potential energy of the time the boom 5 having been moved to a high position is lowered in addition to the inertia energy (kinetic energy) of the time the upper turning body 3 during turning motion is braked.

First, the case of performing the work of operating the front working machine 8 while the upper turning body 3 is turned and driven and loading the soil and the like reserved in the bucket 7 to a dump truck not illustrated, or so-called "soil discharging work", in the hydraulic excavator 1 will be explained. In this case, although a large braking force is applied in stopping the upper turning body 3 matching the position of the dump truck and this braking force can be regenerated as the inertia energy, because the front working machine 8 is driven simultaneously, large power is required for the hydraulic pump 12.

In this case, the regenerative power (regenerative energy) generated by the return hydraulic oil from the hydraulic actuator 17 (turning device 4) when the upper turning body 3 at the time of being turned and driven is braked is calculated as 50 kW for example by the regenerative power calculation unit 15c. Also, assuming the case the pump output used by the front working machine 8 has been calculated as 70 kW for example by the pump output calculation unit 15b, the first threshold value is assumed to be 5 kW for example. At this time, the difference between the output of the hydraulic pump 12 and the regenerative power becomes 20 kW which is equal to or greater than the first threshold value (5 kW) (pump output-regenerative power≥first threshold value). Therefore, as shown in FIG. 3, all of the return hydraulic oil from the hydraulic actuator 17 generated as the upper turning body 3 at the time of being turned and driven is braked by the regeneration control calculation unit 15d is made to flow into the hydraulic regenerative motor 18. Then, the regenerative power of 50 kW is inputted to the regenerative generator 19 for generative motion.

Further, at the same time, this electric power generated by the regenerative generator 19 is supplied to the motor generator 13, and this motor generator 13 is driven to perform assisting of the engine by 50 kW. As a result, because the power of the engine can be reduced by approximately 50 kW portion by this engine assist of 50 kW, the power of this engine 11 can be reduced to 20 kW (70 kW-50 kW). Therefore, the energy is recovered when the upper turning body 3 at the time of being turned and driven is braked, the power of the engine 11 can be reduced by this recovered energy, and the consumption amount of the fuel of this engine 11 can be reduced.

Next, the motion described above will be explained along the time series. FIG. 4 is graphs showing the motion in the soil discharging work of the hydraulic excavator; wherein (a) is the regenerative power, (b) is the pump output, (c) is the engine power, and (d) is the assisting power. Here, in FIG. 4, explanation is made with the premise that the power of the engine 11 changes in a lump shape. Also, at the time of braking turning and the time of boom lowering motion, the regenerative power gradually increases or decreases according to each motion.

First, when regeneration of the energy of the time the upper turning body 3 at the time of being turned and driven is braked is started at the time ts, the assisting power [kW] by the electric power supplied to the motor generator 13 through this regenerative generator 19 increases as shown in FIG. 4 (d) in conjunction with the regenerative power [kW] regenerated by the regenerative generator 19 as shown in FIG. 4 (a). At this time, because the pump output [kW] from the hydraulic pump 12 is constant as shown in FIG. 4 (b), the engine power [kW] of the engine 11 decreases as shown in FIG. 4 (c).

Also, when regeneration of the energy of the time the upper turning body 3 at the time of being turned and driven is braked finishes at the time te, the assisting power [kW] by the motor generator 13 becomes 0 as shown in FIG. 4 (d). Further, as shown in FIG. 4 (c), the engine power [kW] of the engine 11 is restored to the state before start of regeneration.

Next, superiority in energy efficiency in a case the electric power energy generated by the regenerative generator 19 is preferentially supplied to the motor generator 13 and is wholly utilized without being supplied to the capacitor 14 for electrical storage will be explained. In this case, the electric power generated by the regenerative generator 19 is assumed to be 100 (reference value), and Patent Literature 1 and the present invention will be compared and explained. Also, explanation will be made unifying the conversion efficiency of the electromotive components such as the capacitor 14 and the first and second inverters 14a, 19a to 95% for simplification.

Figure 5:
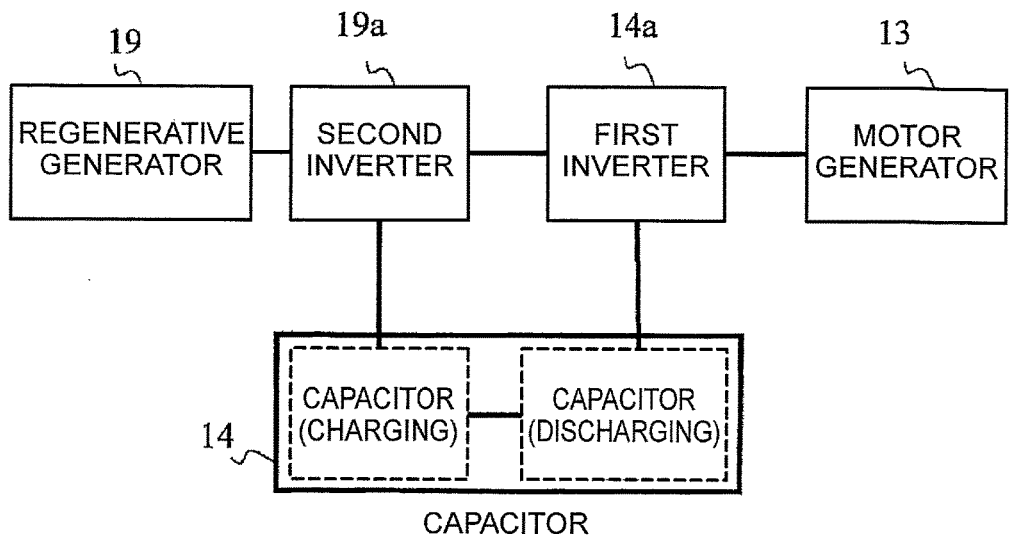
FIG. 5 is a diagrammatic illustration showing an essential part of an electric circuit in a hydraulic drive device of a prior art.
Figure 6:
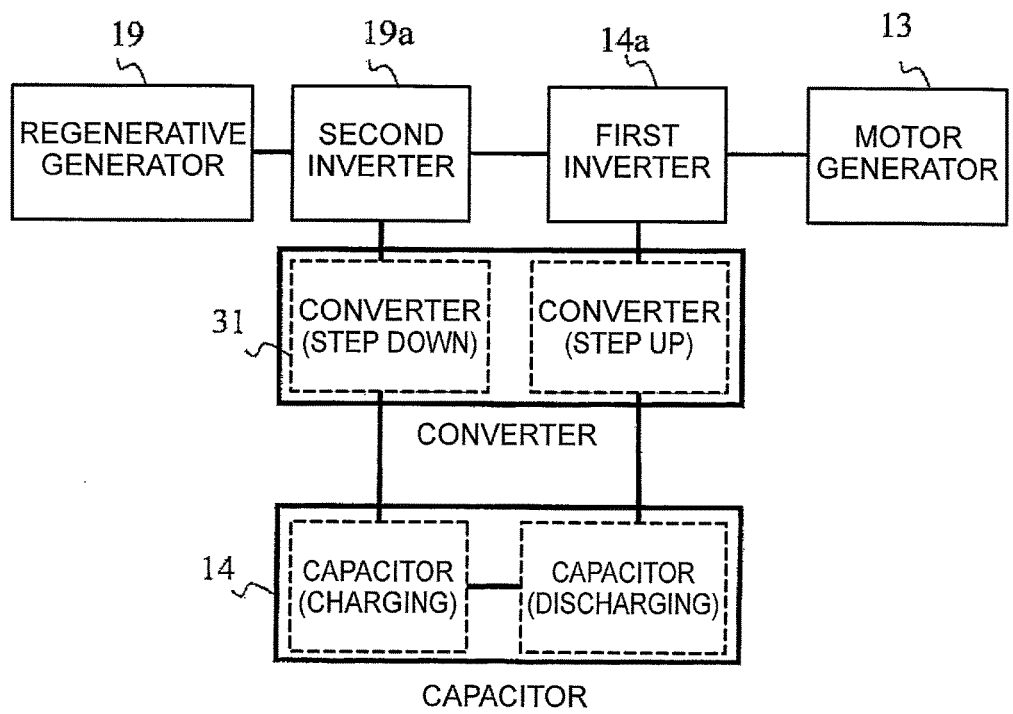
FIG. 6 is a diagrammatic illustration showing an essential part of an electric circuit of another form in a hydraulic drive device of a prior art.
Figure 7A:
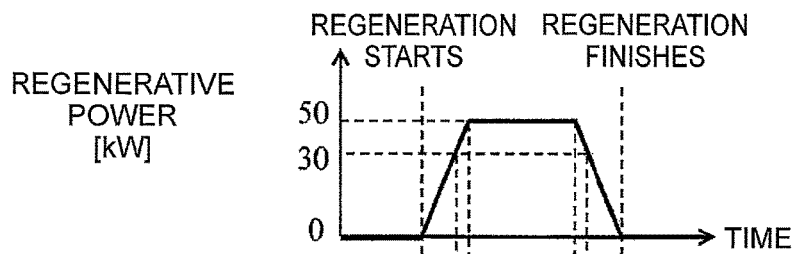
Figure 7B:
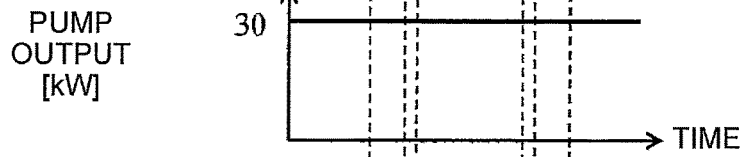
Figure 7C:
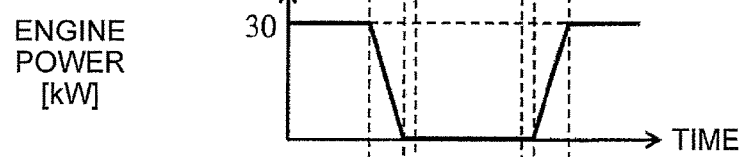
Figure 7D:
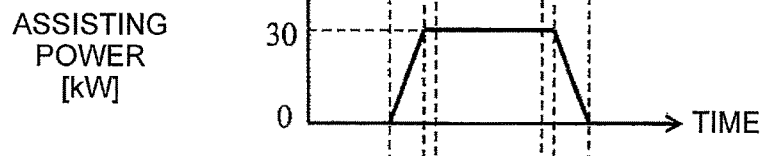
Figure 7E:
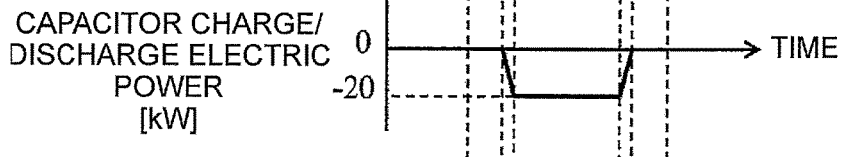
Figure 7F:
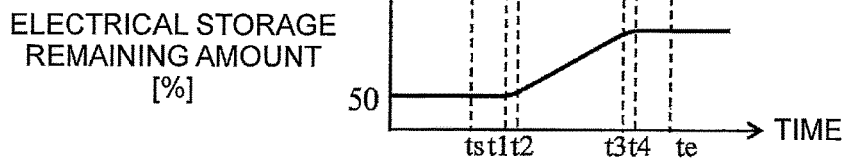

FIG. 5 is a diagrammatic illustration showing an essential part of an electric circuit in a hydraulic drive device of a prior art. FIG. 6 is a diagrammatic illustration showing an essential part of an electric circuit of another form in a hydraulic drive device of a prior art. Further, in FIG. 5 and FIG. 6, the capacitor 14 is described separately as different blocks for each function of charging and discharging in order to show the flow of the electric power, and a converter 31 is described separately as different blocks for each function of stepping-up and stepping-down, however, they are not separate devices physically.

When there is no voltage conversion between the first and second inverters 14a, 19a and the capacitor 14 as shown in FIG. 5, the electric energy obtained by converting the regenerative energy is supplied to the capacitor 14 for charging, and is thereafter reutilized by the motor generator 13 as Patent Literature 1. In this case, the electric power energy generated by the regenerative generator 19 is fed to the motor generator 13 through the route of the second inverter 19a, the capacitor 14 (charging), the capacitor 14 (discharging), and the first inverter 14a. Therefore, because the energy loss in this route is $(0.95)^4$, the electric energy that can be utilized is $100 \times (0.95)^4$ which becomes approximately 81.

On the other hand, in the case of the first embodiment described above, the electric power energy generated by the regenerative generator 19 is fed to the motor generator 13 through the route of the second inverter 19a and the first inverter 14a, and does not perform capacitor 14-mediated charging/discharging. Therefore, because the energy loss of this route is $(0.95)^2$, the electric energy that can be utilized is $100 \times (0.95)^2$ which becomes approximately 90. Accordingly, compared to the case of Patent Literature 1, the regenerative energy of approximately 9% can be effectively reused.

In the case of Patent Literature 1 described above, furthermore, such case is also disclosed in which the converter 31 that is a voltage conversion device such as a battery chopper is also arranged between the first and second inverters 14a, 19a and the capacitor 14 as shown in FIG. 6 for voltage conversion. In this case, the electric power energy generated is fed to the motor generator 13 through the route of the second inverter 19a, the converter 31 (stepping-down), the capacitor 14 (charging), the capacitor 14 (discharging), the converter 31 (stepping-up), and the first inverter 14a. Therefore, because the energy loss in this route is $(0.95)^6$, the electric energy that can be utilized is $100 \times (0.95)^6$ which becomes approximately 74.

On the other hand, in the case of the first embodiment described above, the electric power energy does not go through the capacitor 14 and the voltage converter 31. Therefore, similarly to the case without voltage conversion shown in FIG. 5, the electric power energy generated by the regenerative generator 19 is fed to the motor generator 13 through the route of the second inverter 19a and the first inverter 14a. Accordingly, the electric energy that can be utilized is approximately 90 similarly to the case of FIG. 5, and, compared to Patent Literature 1, the regenerative energy of approximately 16% can be effectively reused.

Next, the case the excess portion of the electric power energy generated by the regenerative generator 19 is made to charge the capacitor 14 will be explained.

The case of performing the motion of operating the upper turning body 3 and the front working machine 8 while lowering the boom 5 in a high position and moving the distal end (claw tip) of the bucket 7 of this front working machine 8 to a desired position or so-called "boom lowering positioning" in the hydraulic excavator 1 will be explained. In this case, when the boom lowering motion is performed, while large potential energy can be recovered from this boom 5, because the upper turning body 3, the arm 6, and the bucket 7 are driven little by little, the power supplied to the hydraulic pump 12 tends to be less relative to the recovered energy.

Also, it is assumed that the first threshold value is 5 kW and the set value of the electrical storage remaining amount of the capacitor 14 is set at 70% for example. Here, this set value of the electrical storage remaining amount is within the electrical storage range the capacitor 14 can be used without involving rapid deterioration, is set for preventing excessive charging to the capacitor 14, and changes according to the specification of the capacitor 14 to be used. Also, this set value of the electrical storage remaining amount is determined for every capacitor 14, is set in incorporating the capacitor 14, and is set to be automatically read-in by the controller 15.

In this state, the case is assumed in which the regenerative power generated by the return hydraulic oil in lowering the boom is calculated as 50 kW for example by the regenerative power calculation unit 15c and the output of the hydraulic pump 12 used by the turning device 4, the arm 6, and the bucket 7 is calculated as 30 kW for example by the pump output calculation unit 15b. In this case, the difference between the output of the hydraulic pump 12 and the regenerative power becomes −20 kW for example which is less than the first threshold value (5 kW).

Also, when the electrical storage remaining amount of the capacitor 14 calculated by the electrical storage remaining amount calculation unit 15a is 50% for example, all of the return hydraulic oil from the hydraulic actuator 17 generated by the boom lowering motion is made to flow into the hydraulic regenerative motor 18 without being limited, and all of this generative power of 50 kW is inputted to the regenerative generator 19 for generative motion. At the same time, 30 kW portion corresponding to the output of the hydraulic pump 12 out of the electric power generated by this regenerative generator 19 is supplied to the motor generator 13, drives this motor generator 13, and assists the engine by 30 kW. Then, the excess portion of 20 kW (50 kW-30 kW) not supplied to the motor generator 13 is supplied to the capacitor 14, and is stored in this capacitor 14.

Next, the motions described above will be explained along the time series. FIG. 7 is graphs showing the motion of a case the excess portion out of the regenerative energy of the hydraulic excavator related to the first embodiment of the present invention is charged to the capacitor; wherein (a) is the regenerative power, (b) is the pump output, (c) is the engine power, (d) is the assisting power, (e) is the capacitor charge/discharge electric power (+ is discharging, − is charging), and (f) is the electrical storage remaining amount.

From the time is when the boom lowering motion is started and the return hydraulic oil from the hydraulic actuator 17 is supplied to the hydraulic regenerative motor 18 to start regeneration of the energy until the time t1 when the assisting power to the motor generator 13 required for drive of the hydraulic pump 12 reaches 30 kW that is the upper limit value thereof, as shown in FIG. 7 (a) and FIG. 7 (d), all of the regenerative power regenerated by the regenerative generator 19 is supplied to the motor generator 13. Then, the assisting power to this motor generator 13 is increased.

Thereafter, from the time t1 when this assisting power reaches the upper limit value until the time t4 when this assisting power becomes equal to or less than the upper limit value, as shown in FIG. 7 (d), 30 kW that is the portion of the output of the hydraulic pump 12 out of the regenerative power regenerated by the regenerative generator 19 is supplied preferentially to the motor generator 13. Then, as shown in FIG. 7 (e), the regenerative power of the excess portion not supplied to this motor generator 13 is converted to the electric power, is supplied to the capacitor 14, and is stored in this capacitor 14 as shown in FIG. 7 (f).

Further, from the time t4 when the assisting power becomes equal to or less than the upper limit value until the time to when regeneration by the regenerative generator 19 finishes, as shown in FIG. 7 (a) and FIG. 7 (d), in conjunction with drop of the regenerative power regenerated by this regenerative generator 19, the assisting power drops. Therefore, as shown in FIG. 7 (b) and FIG. 7 (c), the engine power is increased corresponding to drop of the assisting power so that the output of the hydraulic pump 12 is maintained at 30 kW.

Here, under the condition described above, when the electrical storage remaining amount of the capacitor 14 is 75% for example, because the electrical storage remaining amount is higher than the set value (70%) of the electrical storage remaining amount of this capacitor 14, electrical storage to this capacitor 14 is not performed from the viewpoint of protecting this capacitor 14. More specifically, with respect to the flow rate of the return hydraulic oil from the hydraulic actuator 17, the valve opening is controlled in the flow dividing valve 50 through the regeneration control calculation unit 15d, the hydraulic oil of the portion of the regenerative power corresponding to the output of the hydraulic pump 12 (30 kW) is made to flow into the hydraulic regenerative motor 18, and the hydraulic oil of the excess portion not made to flow into this hydraulic regenerative motor 18 is returned to the hydraulic oil tank 21. As a result, the regenerative power regenerated by the regenerative generator 19 by drive of this hydraulic regenerative motor 18 becomes 30 kW that is equal to the output of the hydraulic pump 12, this regenerative power is supplied to the motor generator 13, and engine assist of 30 kW portion which corresponds to the output of the hydraulic pump 12 is performed.

Next, the control motion of the case the electrical storage remaining amount of the capacitor 14 is 75% will be explained along the time series. FIG. 8 is graphs showing the motion of a case the electrical storage remaining amount of the capacitor 14 of the hydraulic excavator is equal to or greater than the set value; wherein (a) is the regenerative power, (b) is the pump output, (c) is the engine power, (d) is the assisting power, (e) is the capacitor charge/discharge electric power (+ is discharging, − is charging), and (f) is the electrical storage remaining amount.

From the time is to the time t1, as shown in FIG. 8 (a) and FIG. 8 (b), the regenerative power regenerated by the regenerative generator 19 does not exceed the output of the hydraulic pump 12. Therefore, as shown in FIG. 8 (c) and FIG. 8 (d), all of the regenerative power regenerated by the regenerative generator 19 is supplied to the motor generator 13 as the assisting power to assist the engine, and the engine power is lowered.

Next, from the time t1 when the regenerative power becomes equal to or greater than the pump output until the time t2 when this regenerative power becomes less than the pump output, the electrical storage remaining amount of the capacitor 14 (75%) is higher than the set value (70%), and the regenerative power equal to or greater than the output of the hydraulic pump 12 cannot be utilized in order to prevent the damage of this capacitor 14 by overcharging. Therefore, in order that the regenerative power of the excess portion of equal to or greater than the output of this hydraulic pump 12 (30 kW) is not generated, the flow rate (supply amount) of the return hydraulic oil from the hydraulic actuator 17 to the hydraulic regenerative motor 18 is controlled using the flow dividing valve 50, and the hydraulic oil of the portion corresponding to the regenerative power of the excess portion is returned to the hydraulic oil tank 21. Here, this regenerative power of the excess portion corresponds to the region T1 in FIG. 8 (a).

Further, at the time t2 and onward, the time t2 being the time when the regenerative power regenerated by the regenerative generator 19 reduces and this regenerative power becomes less than the output of the hydraulic pump 12, the control motions become similar to those of the time t4 and onward shown in FIG. 7.

Incidentally, when the electrical storage remaining amount is higher than the set value, it is also possible to supply the electric power from the capacitor 14 to the motor generator 13 to assist the engine. In this case, in a state the return hydraulic oil from the hydraulic actuator 17 is supplied to the hydraulic regenerative motor 18, the assisting power value by the electric power from the capacitor 14 to the motor generator 13 and the assisting power value of the electric power generated by the regenerative generator 19 to the motor generator 13 are calculated. Then, the flow rate to the hydraulic regenerative motor 18 is adjusted using the flow dividing valve 50 so that the total of these assisting power values will correspond to the output of the hydraulic pump 12, and the electric power from the regenerative generator 19 to the motor generator 13 is controlled. Further, although calculation of the assisting power value from the capacitor 14 to the motor generator 13 is not to be limited to one, as an example, assisting power value calculation corresponding to the electrical storage amount can be cited which uses a calculation table not illustrated within the controller 15 in which the electrical storage amount of the electrical storage remaining amount calculation unit 15a and the assisting power value correspond to each other.

Also, under the condition described above, when the electrical storage remaining amount of the capacitor 14 calculated by the electrical storage remaining amount calculation unit 15a is equal to or less than the setting value thereof (70%), for example 65%, because this electrical storage remaining amount of the capacitor 14 is less than the set value, all of the return hydraulic oil from the hydraulic actuator 17 is made to flow into the hydraulic regenerative motor 18, and the electric power is generated by the regenerative generator 19. Further, while the electric energy of the portion corresponding to the output of the hydraulic pump 12 out of this electric energy generated by the regenerative generator 19 is supplied to the motor generator 13 to assist the engine, the remaining electric energy of the excess portion is supplied to the capacitor 14 for storage.

Here, by continued supply of this electric energy of the excess portion to the capacitor 14, the electrical storage remaining amount of this capacitor 14 gradually increases, and the electrical storage remaining amount of this capacitor 14 becomes the set value after a fixed time. In this case, switching determination is made by the controller 15, the flow rate of the return hydraulic oil from the hydraulic actuator 17 is controlled by the flow dividing valve 50, and the hydraulic oil of the regenerative power portion corresponding to the output of the hydraulic pump 12 (30 kW) is made to flow into the hydraulic regenerative motor 18. Then, all of the regenerative power regenerated by the regenerative generator 19 by drive of this hydraulic regenerative motor 18 is supplied to the motor generator 13 to assist the engine by 30 kW portion which corresponds to the output of the hydraulic pump 12.

Next, the control motion of the case the electrical storage remaining amount of the capacitor 14 is 65% will be explained along the time series. FIG. 9 is graphs showing the motion of a case the electrical storage remaining amount of the capacitor 14 of the hydraulic excavator is less than the set value; wherein (a) is the regenerative power, (b) is the pump output, (c) is the engine power, (d) is the assisting power, (e) is the capacitor charge/discharge electric power (+ is discharging, − is charging), and (f) is the electrical storage remaining amount.

From the time ts when the boom lowering motion is started and regeneration of the energy by the return hydraulic oil from the hydraulic actuator 17 is started until the time t3 when the electrical storage remaining amount of the capacitor 14 reaches the set value, the control motions similar to those in the duration from the time ts to the time t2 shown in FIG. 2 are performed.

Next, from the time t3 when the electrical storage remaining amount of the capacitor 14 reaches the set value until the time t4 when this electrical storage remaining amount of the capacitor 14 becomes less than the set value, the flow rate of the return hydraulic oil from the hydraulic actuator 17 is limited, and the hydraulic oil of only the regenerative power portion corresponding to the output of the hydraulic pump 12 (30 kW) is made to flow into the hydraulic regenerative motor 18 by controlling the flow dividing valve 50. Then, all of the regenerative power regenerated by the regenerative generator 19 is supplied to the motor generator 13, engine assist of 30 kW portion corresponding to the output of the hydraulic pump 12 is performed, charging to the capacitor 14 is stopped, and the electric power supplied to this capacitor becomes 0. Therefore, at the time t3 and onward, the control motions similar to those of the time t1 and onward shown in FIG. 8 are performed. At this time, the region T2 in FIG. 9 (a) shows the energy amount corresponding to the portion of the hydraulic oil returned to the hydraulic oil tank 21 and cannot be effectively utilized out of the return hydraulic oil from the hydraulic actuator 17.

Here, in FIG. 9, at the same time as the electrical storage remaining amount reaches the set value (70%), supply of the electric power to the capacitor 14 is stopped immediately and the charging motion is stopped, however it is also possible to gradually suppress the electric power supply amount to the capacitor 14 as this electrical storage remaining amount of the capacitor 14 comes close to the set value and to increase the working oil supply amount to the hydraulic oil tank 21 corresponding to this suppression of the electric power supply amount. Further, the set value is not fixed, and it is also possible to be set according to the specification, use frequency, elapsed time of use, and so on of the capacitor 14 for example.

Therefore, in the case a single motion of the boom lowering motion for lowering the boom 5 in a high position or the turning stop motion for stopping the upper turning body 3 during being turned and driven is performed, the hydraulic actuators other than that of the boom cylinder 5a or the turning device 4 are not operated. Accordingly, relative to large regenerative energy that can be recovered from these boom cylinder 5a or the turning device 4, the output of the hydraulic pump 12 becomes a comparatively low load. In this case also, as shown in FIG. 7 to FIG. 9, by supplying the assisting power of only the portion corresponding to the output of the hydraulic pump 12 to the motor generator 13 to assist the engine, switching of the charging motion corresponding to the electrical storage remaining amount of the capacitor 14 becomes possible.

Also, at the time of working of these boom lowering motion and turning stop motion, compared to other motions such as the soil discharging work for example, the output to the hydraulic pump 12 is less. Therefore, acceleration of the engine 11 may occur because the assisting power to be supplied to the motor generator 13 is supplied so as to exceed the portion corresponding to the pump output. In this case, the engine rotational speed is detected by the rotational speed sensor 11a, and when this engine rotational speed detected by the rotational speed sensor 11a becomes overspeed exceeding the second threshold value, supply of the assisting power to the motor generator 13 is stopped, engine assist is stopped, and thereby excessive assist for the engine 11 can be prevented.

Further, the first threshold value used for comparison against the difference between the output of the hydraulic pump 12 and the regenerative power the return hydraulic oil from the hydraulic actuator 17 has may be set considering the detection error of the sensor and the like. As a result, the detection error of each sensor such as the discharge pressure sensor 12d, the flow meters 12e, 18e, 21a, and the pressure sensor 18d and unintended control of the controller 15 caused by pressure pulsation of the hydraulic oil can be prevented. Here, FIG. 10 is graphs showing the relationship of the output of the hydraulic pump 12 and the regenerative power; wherein (a) is the actual relationship, and (b) is the relationship calculated by the pump output calculation unit and the regeneration control calculation unit.

Figure 10A:
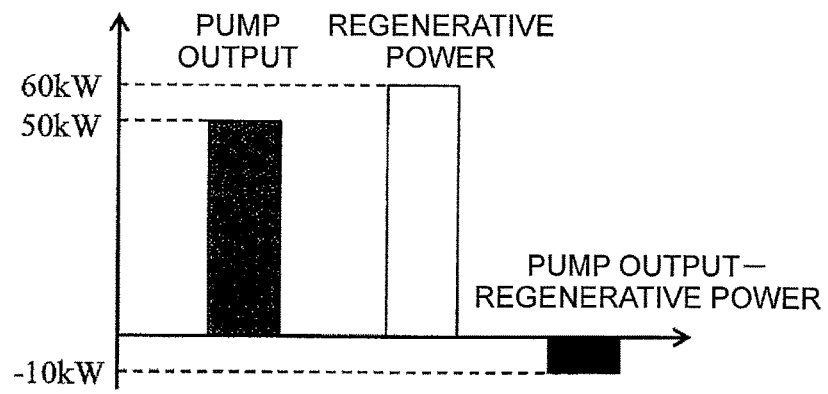
Figure 10B:
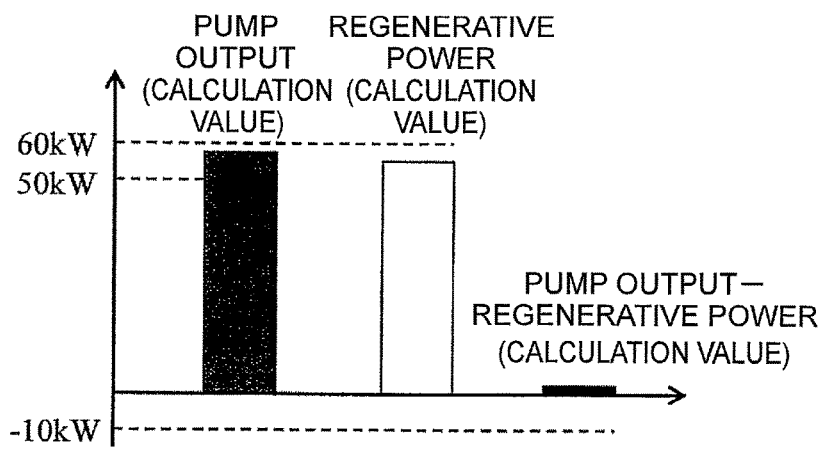

More specifically, it is assumed that the pump output calculated by the pump output calculation unit 15b becomes 55 kW and the regenerative power calculated by the regenerative power calculation unit 15c becomes 54 kW as shown in FIG. 10 (b) although the actual pump output is 50 kW and the actual generative power is 60 kW, and that it is calculated that there is 10% error relative to the actual true values. Intrinsically, only the assisting power corresponding to the pump output should be supplied to the motor generator 13 to assist the engine, however, when the first threshold value is set at a small value equal to or more than 0 kW and less than 1 kW for example, in this case, the controller 15 erroneously determines that the calculated pump output is greater than the regenerative power. Therefore, all of the regenerative power of the return hydraulic oil from the hydraulic actuator 17 is supplied to the motor generator 13 to assist the engine.

In other words, the actual pump output is 50 kW whereas the regenerative power is 60 kW, and when all of the regenerative power is supplied to the motor generator 13 and is used for engine assist, the engine 11 comes to be assisted excessively by the portion of approximately 10 kW, and there is a risk of over revolution of the engine 11.

Therefore, as described above, the first threshold value of approximately 5 kW for example considering the detection error is set. Also, when "pump output-regenerative power-≤first threshold value" has been achieved, the assisting power of only the portion corresponding to the output of the hydraulic pump 12 is supplied to the motor generator 13, the excess portion thereof is supplied to the capacitor 14 for charging or is returned to the hydraulic oil tank 21, and thereby excessive assist for the engine 11 is suppressed.

Further, by separately setting the tolerance considering the detection error and the like and calculating the assisting amount for the engine 11 by the motor generator 13 by "pump output-tolerance" by the regeneration control calculation unit 15d, the engine 11 comes to bear the pump output of the portion corresponding to the tolerance. Therefore, over revolution of the engine 11 can be prevented more effectively.

This motion will be explained along the time series. FIG. 11 is graphs of a case the hydraulic excavator executes the boom lowering positioning motion; wherein (a) is the regenerative power, (b) is the pump output, (c) is the engine power, (d) is the assisting power, (e) is the capacitor charge/discharge electric power (+ is discharging, − is charging), and (f) is the electrical storage remaining amount.

From the time ts when the boom lowering positioning motion is started and regeneration of the energy by the return hydraulic oil from the hydraulic actuator 17 is started until the time t1 when the assisting power to the motor generator 13 required for drive of the hydraulic pump 12 reaches 30 kW that is the upper limit value thereof, the control motions similar to those from the time ts to the time t1 shown in FIG. 7 are performed. However, in this case, compared to the case of FIG. 7, the assisting power is set lower by approximately the portion of the tolerance (5 kW), and each of the engine power and the supply electric power to the capacitor 14 is set higher by approximately the portion of the tolerance (5 kW). Further, in the motion of the time t1 and onward also, the control motions similar to those at the time of t1 and onward shown in FIG. 7 are performed with the exception of the points that the assisting power is reduced by approximately the portion of the tolerance (5 kW) and that the engine power and the supply electric power to the capacitor 14 increase.

The tolerance is determined considering the detection error of each sensor and the like, and when determination of "(pump output-tolerance)−regenerative power≤first threshold value" has been achieved, the assisting power of only the portion corresponding to (output of hydraulic pump 12-tolerance) is supplied to the motor generator 13, the excess portion thereof is supplied to the capacitor 14 for electrical storage or is returned to the hydraulic oil tank 21, thereby excessive assist for the engine 11 can be suppressed, and over revolution of the engine 11 can be prevented.

<Action and Effect>

As described above, according to the hydraulic excavator 1 related to the first embodiment described above, the flow dividing valve 50 is controlled according to the command value calculated by the regeneration control calculation unit 15d based on the pump output calculated by the pump output calculation unit 15b of the controller 15 and the regenerative power of the return hydraulic oil from the hydraulic actuator 17 to the hydraulic regenerative motor 18 calculated by the regenerative power calculation unit 15c, and the flow rate of the hydraulic oil made to flow into the hydraulic regenerative motor 18 is controlled.

In other words, by controlling the flow rate of the hydraulic oil made to flow into the hydraulic regenerative motor 18 according to the regenerative power accompanying the flow rate and the pressure of the return hydraulic oil from the hydraulic actuator 17, the energy or the regenerative power the return hydraulic oil from the hydraulic actuator 17 has can be properly utilized corresponding to various motions of the construction machinery. Therefore, the energy of the return hydraulic oil from the hydraulic actuator 17 can be more efficiently utilized.

In particular, when the difference between the pump output calculated by the pump output calculation unit 15b and the regenerative power calculated by the regenerative power calculation unit 15c is greater than the first threshold value, all of the return hydraulic oil from the hydraulic actuator 17 is made to flow into the hydraulic regenerative motor 18 by controlling the regeneration control calculation unit 15d, and all of the electric power generated by the regenerative generator 19 is supplied to the motor generator 13. As a result, all of the energy the return hydraulic oil from the hydraulic actuator 17 has can be utilized for assisting drive of the engine 11.

Also, the capacitor 14 is connected to the regenerative generator 19 through the second inverter 19a, and this capacitor 14 is connected to the motor generator 13 through the first inverter 14a. As a result, the hydraulic regenerative motor 18 is driven by the return hydraulic oil from the hydraulic actuator 17, and the electric power generated as the regenerative generator 19 is driven by this drive of the hydraulic regenerative motor 18 can be stored properly in the capacitor 14. Also, at the same time, the electric power stored in the capacitor 14 can be properly supplied to the motor generator 13, and can be utilized for assisting drive of the engine 11.

Further, when the difference between the pump output and the regenerative power is less than the first threshold value and the electrical storage remaining amount calculated by the electrical storage remaining amount calculation unit 15a is less than the set value, all of the return hydraulic oil from the hydraulic actuator 17 is made to flow into the hydraulic regenerative motor 18. Then, the electric power of the portion corresponding to the pump output of the hydraulic pump 12 out of the electric power generated by the regenerative generator 19 is supplied to the motor generator 13, and remaining electric power of the excess portion is supplied to the capacitor 14. As a result, while the energy the return hydraulic oil from the hydraulic actuator 17 has can be utilized preferentially for assisting drive of the engine 11 by the motor generator 13, the remaining electric power not supplied to this motor generator 13 can be supplied to the capacitor 14 for charging. Therefore, the energy the return hydraulic oil from the hydraulic actuator 17 has can be reused more effectively and properly. More specifically, because the regenerative energy is preferentially used for assisting the engine, the charging amount of the capacitor 14 can be lowered. Accordingly, the maximum capacity of the capacitor 14 to be mounted can be reduced, and therefore the capacitor 14 can be made compact.

Also, when the difference between the pump output and the regenerative power is less than the first threshold value and the electrical storage remaining amount is higher than the set value, the flow rate of the return hydraulic oil from the hydraulic actuator 17 is controlled so that the electric power generated by the regenerative generator 19 becomes equal to or less than the power of the portion corresponding to the pump output. Further, this hydraulic oil whose flow rate is controlled is made to flow into the hydraulic regenerative motor 18, and all of the electric power generated by the regenerative generator 19 is supplied to the motor generator 13. Therefore, because the assisting amount of drive of the engine 11 by the motor generator 13 can be adjusted to equal to or less than the output of the hydraulic pump 12, excessive assist for the engine 11 by the motor generator 13 can be suppressed.

In other words, because the electric power is not supplied to the capacitor 14 under the situation the electrical storage remaining amount is sufficient, overcharging of this capacitor 14 can be prevented. Accordingly, because the frequency of charging to the capacitor 14 can be lowered, deterioration of the capacitor 14 accompanying charging and discharging can be prevented, and the life of the capacitor 14 can be extended. Also, at the same time, because the greater assisting amount can be calculated out of the assisting amount for the drive of the engine 11 corresponding to the regenerative power and the assisting amount for the drive of the engine 11 currently performed, engine stall caused by power shortage and deterioration of operability can also be prevented.

Also, when the rotational speed of the engine 11 becomes equal to or greater than the second threshold value in a state the electric power generated by the regenerative generator 19 is supplied to the motor generator 13 and drive of the engine 11 is assisted by this motor generator 13, supply of the electric power from the regenerative generator 19 to the motor generator 13 through the first and second inverters 14a, 19b is stopped. As a result, damage and the like can be prevented which possibly occur when the rotational speed of this engine 11 excessively increases in a state the electric power generated by the regenerative generator 19 is supplied to the motor generator 13 and drive of the engine 11 is assisted. Also, at the same time, when the electrical storage remaining amount is less than the set value, the return hydraulic oil from the hydraulic actuator 17 is not made to flow into the hydraulic regenerative motor 18, and supply of the electric power to the capacitor 14 is stopped. Therefore, because this supply of the electric power to the motor generator 13 through the capacitor 14 can be properly stopped, over revolution of the engine 11 can be prevented.

Also, because engine assist is controlled based only on the rotational speed of the engine 11, even in a case excessive regenerative power by the return hydraulic oil from the hydraulic actuator 17 is supplied to the motor generator 13 and is going to assist the engine when various sensors of the hydraulic drive control device 10 except the rotational speed sensor 11a make erroneous detection and so on, this supply of the electric power to the motor generator 13 is stopped, and over revolution of the engine 11 is prevented.

Second Embodiment

Figure 12:
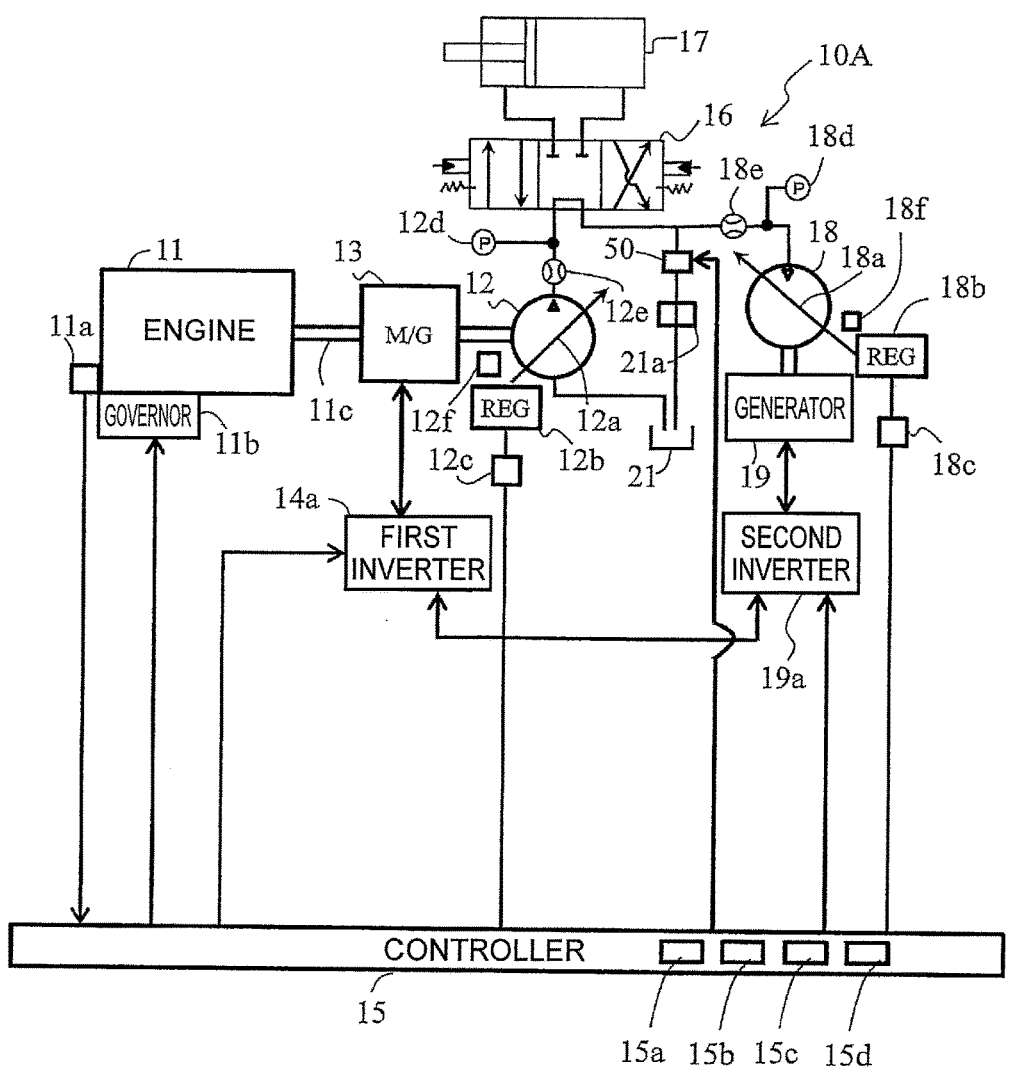
FIG. 12 is a hydraulic circuit diagram showing a hydraulic drive device of a hydraulic excavator related to the second embodiment of the present invention.

FIG. 12 is a hydraulic circuit diagram showing the hydraulic drive device of the hydraulic excavator related to the second embodiment of the present invention. The present second embodiment is different from the first embodiment described above in terms that the capacitor 14 is attached between the first inverter 14a and the controller 15 in the hydraulic drive control device 10 in the first embodiment whereas the hydraulic drive control device 10A has no capacitor 14 in the second embodiment. Also, in the present second embodiment, the portion same as or corresponding to that of the first embodiment is marked with a same reference sign.

<Configuration>

In concrete terms, in the present second embodiment, as shown in FIG. 12, the first inverter 14a is electrically connected to each of the motor generator 13, the controller 15, and the second inverter 19a. More specifically, the first inverter 14a controls the motor generator 13 based on the instruction from the controller 15. On the other hand, the second inverter 19a is electrically connected to each of the regenerative generator 19, the controller 15, and the first inverter 14a. This second inverter 19a drives the hydraulic regenerative motor 18 by the regenerative power the return hydraulic oil from the hydraulic actuator 17 has based on the instruction from the controller 15, converts the regenerative power to the electric power by the regenerative generator 19, supplies this electric power to the motor generator 13, and assists drive of the engine 11.

<Action and Effect>

By the above, according to the hydraulic drive control device 10A related to the second embodiment described above, the hydraulic regenerative motor 18 is driven by the regenerative power the return hydraulic oil from the hydraulic actuator 17 has based on the instruction from the controller 15. Accordingly, the regenerative generator 19 is driven by this hydraulic regenerative motor 18, the electric power converted by this regenerative generator 19 can be supplied to the motor generator 13 through the second inverter 19a and the first inverter 14a, so that the motor generator 13 can be driven and drive of the engine 11 can be assisted by the regenerated power. Therefore, even the hydraulic drive control device 10A not having the capacitor 14 can exert the action and effect similar to those of the first embodiment described above.

Third Embodiment

Figure 13:
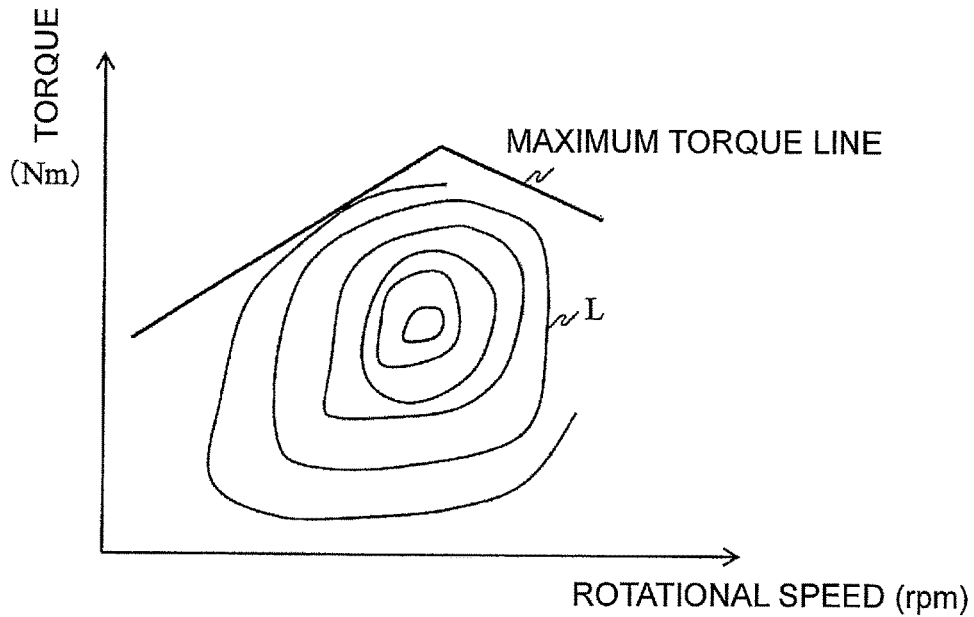
FIG. 13 is a graph showing the efficiency characteristics of an engine of a hydraulic excavator related to the third embodiment of the present invention.
Figure 14:
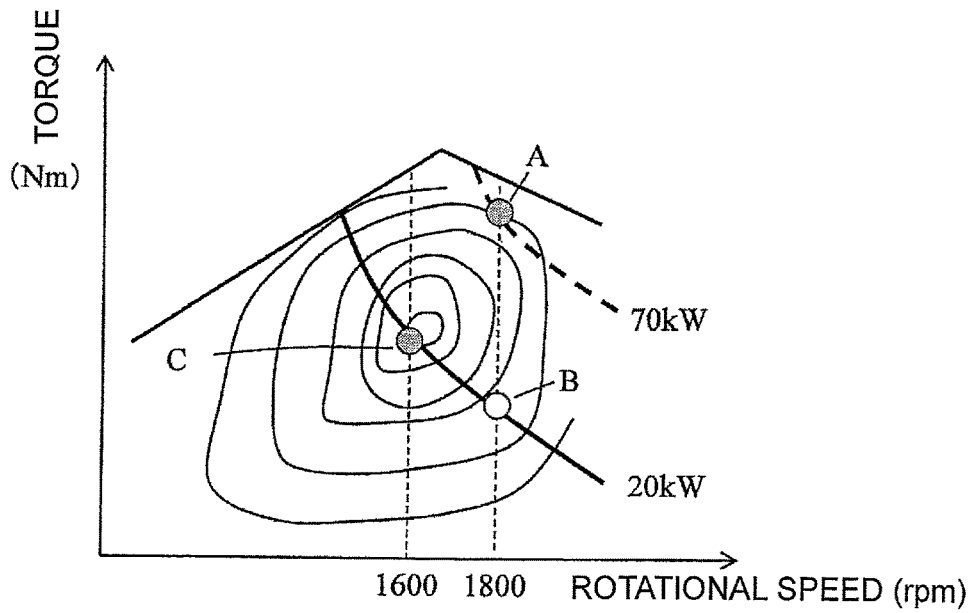
FIG. 14 is a graph showing a calculation example of the target rotational speed of the engine in FIG. 13 above.

FIG. 13 is a graph showing the efficiency characteristics of an engine of a hydraulic excavator related to the third embodiment of the present invention. FIG. 14 is a graph showing a calculation example of the target rotational speed of the engine in FIG. 13. The present third embodiment is different from the first embodiment described above in terms that the efficiency characteristics of the engine 11 are not considered in the first embodiment whereas the efficiency characteristics of the engine 11 are considered in the third embodiment. Also, in the present third embodiment, the portion same as or corresponding to that of the first embodiment is marked with a same reference sign.

<Configuration>

In concrete terms, in the present third embodiment, the efficiency characteristics of the engine are stored beforehand in the controller 15, and the controller 15 calculates the target rotational speed of the engine 11 according to the efficiency characteristics. The controller 15 calculates the correction value of the power of the engine 11 based on the pump output calculated by the pump output calculation unit 15b and the regenerative power calculated by the regenerative power calculation unit 15c in a state the electric power generated by the regenerative generator 19 is supplied to the motor generator 13, and corrects the target rotational speed of the engine 11 based on this calculated correction value of the power of the engine 11.

More specifically, as shown in FIG. 13, the high efficiency point of the efficiency characteristics of the engine 11 differs according to the output as the contour L on the characteristics diagram that compares the engine torque and the engine rotational speed. Also, the controller 15 calculates the output of the hydraulic pump 12 as 70 kW by the pump output calculation unit 15b similarly to the first embodiment described above in a state before the hydraulic regenerative motor 18 is driven by the return hydraulic oil from the hydraulic actuator 17 (before start of regeneration), and calculates the regenerative power the return hydraulic oil from the hydraulic actuator 17 has as 50 kW by the regenerative power calculation unit 15c in a state drive of the engine 11 is assisted by the motor generator 13 (at the time regeneration is performed). The controller 15 calculates the difference between the pump output and the regenerative power, and makes the correction value of the power of the engine 11 20 kW.

<Motion>

As shown in FIG. 14, in a state the engine 11 is operated at the high efficiency operation point A at the rotational speed 1,800 rpm for example at the time the power is 70 kW, and when the power is lowered to 20 kW without changing the rotational speed of the engine 11, the engine 11 is operated at the operation point B where the driving efficiency of the engine 11 is low. In this case, as described above, the correction value of the power of the engine 11 is calculated based on the pump output calculated by the pump output calculation unit 15*b* and the regenerative power calculated by the regenerative power calculation unit 15*c*, and the target rotational speed of the engine 11 is corrected based on this calculated correction value of the power of the engine 11.

As a result, because the engine rotational speed of the case the motor generator 13 is driven by the regenerative power to assist the engine is set at the maximum efficiency operation point corresponding to each power of the engine 11, the engine rotational speed in the case the power of the engine 11 is lowered to 20 kW is set at 1,600 rpm in FIG. 6 for example which is the high efficiency operation point C in this case.

Figure 15A:
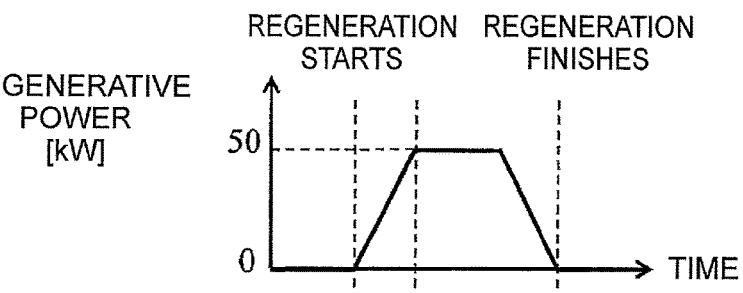
Figure 15B:
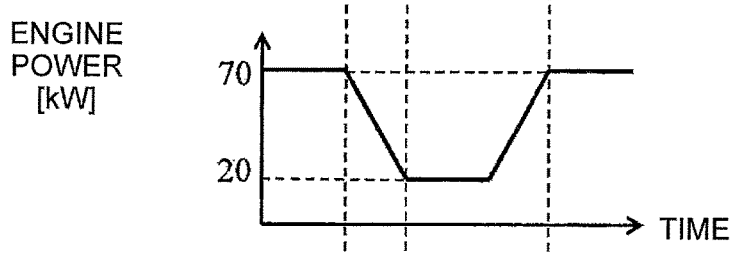
Figure 15C:
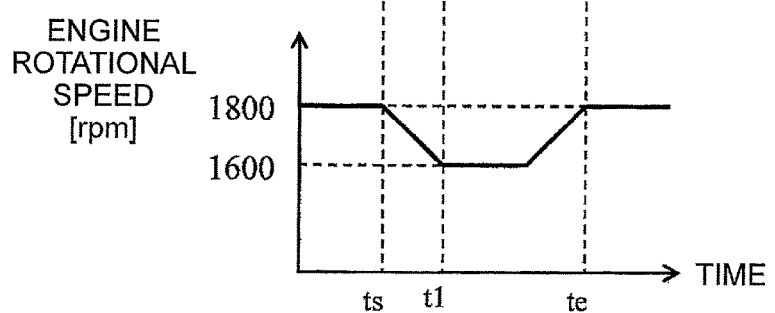

Next, the motion described above will be explained along the time series. FIG. 15 is graphs showing the motion in the soil discharging work of the hydraulic excavator; wherein (a) is the regenerative power, (b) is the engine power, and (c) is the engine rotational speed. Further, in FIG. 15 also, a high efficiency operation point corresponding to each power of the engine 11 is selected before and after the engine is assisted by the regenerative power.

First, until the time is when regeneration of the energy is started, the high efficiency operation point A in the case of 70 kW of the engine power is selected as shown in FIG. 14, and the engine 11 is operated at 1,800 rpm as shown in FIG. 15 (*c*). When regeneration of the energy is started in this state, the regenerative power regenerated by the hydraulic regenerative motor 18 gradually increases as shown in FIG. 15 (*a*), and the engine power of the engine 11 reduces as shown in FIG. 15 (*c*) in conjunction with this increase of the regenerative power.

At this time, the regenerative power gradually increases, and at the time t1 when the engine power becomes 20 kW, the high efficiency operation point C with the maximum engine efficiency is selected according to this engine power, and the rotational speed of the engine 11 is automatically adjusted to 1,600 rpm. Further, when regeneration of the energy finishes at the time te, as shown in FIG. 15 (*b*), the engine power of the engine 11 is returned to that of before start of regeneration.

<Action and Effect>

From the above, according to the hydraulic excavator 1 related to the third embodiment described above, the target rotational speed of the engine 11 is calculated according to the efficiency characteristics with respect to the power of the engine 11. Then, the correction value of the engine 11 is calculated based on the pump output calculated by the pump output calculation unit 15*b* and the regenerative power calculated by the regenerative power calculation unit 15*c* in a state the electric power generated by the regenerative generator 19 is supplied to the motor generator 13, and the target rotational speed of the engine 11 is corrected based on this calculated correction value of the power of the engine 11. As a result, when the power of the engine 11 changes by engine assist by the motor generator 13, the engine rotational speed with excellent efficiency can be set as the target rotational speed according to the efficiency characteristics with respect to the power of the engine 11. Therefore, the fuel consumption amount of this engine 11 can be lowered properly.

In other words, when the motor generator 13 is driven by the regenerative power the return hydraulic oil from the hydraulic actuator 17 has to assist the engine, the rotational speed of the engine 11 is set at the maximum efficiency operation point corresponding to the power of the engine 11. Therefore, the engine rotational speed in the case the power of the engine 11 is lowered to 20 kW for example is set at the high efficiency operation point C in this case. Accordingly, because the engine 11 can be driven more efficiently compared to the case the power is reduced without changing the rotational speed of the engine 11, the fuel efficiency of the hydraulic excavator 1 can be further improved.

Fourth Embodiment

The present fourth embodiment is different from the first embodiment described above in terms that the output of the hydraulic pump 12 can be covered only by the engine 11 in the first embodiment whereas the engine 11 is made compact and so on and the output of the hydraulic pump 12 cannot be covered only by the engine 11 in the fourth embodiment. Further, in the present fourth embodiment also, the portion same as or corresponding to that of the first embodiment is marked with a same reference sign.

[Configuration]

In concrete terms, in the present fourth embodiment, even at the time of non-regeneration, the controller 15 supplies the electric power stored in the capacitor 14 to the motor generator 13, and assists drive of the engine 11 by drive of this motor generator 13. Also, at the time of regeneration when the return hydraulic oil from the hydraulic actuator 17 is made to flow into the hydraulic regenerative motor 18 in a state the electric power is supplied from the capacitor 14 to the motor generator 13 and the engine is assisted by drive of this motor generator 13, the controller 15 controls the electric power supplied from the capacitor 14 to the motor generator 13 according to the regenerative power calculated by the regenerative power calculation unit 15*c*.

<Motion>

Here, a case will be explained as an example in which, although the pump output used by the front working machine 8 is 70 kW, the output of the engine 11 is 60 kW, the motor generator 13 is driven by 10 kW by the electric power supplied from the capacitor 14, and drive of the engine 11 is assisted. Also, the regenerative power regenerated from the return hydraulic oil from the hydraulic actuator 17 is assumed to be 50 kW, and the first threshold value is assumed to be 5 kW.

In this case, the difference (20 kW) between the pump output (70 kW) used by the front working machine 8 and the regenerative power (50 kW) is greater than the first threshold value (5 kW). Therefore, similarly to the first embodiment described above, each of the motor generator 13, the regeneration control calculation unit 15*d*, and the regenerative generator 19 is controlled. More specifically, the regenerative energy of the return hydraulic oil from the hydraulic actuator 17 is converted to the electric power by the regenerative generator 19 through the hydraulic regenerative motor 18, and all of this electric power is supplied to the motor generator 13 and is used to assist the engine.

However, because the motor generator 13 assists the engine beforehand by supply of the electric power from the capacitor 14, at the time the engine is assisted by this electric power supply from the capacitor 14, the engine is assisted by the regenerative energy. Therefore, the controller 15 compares the current assisting power value (10 kW) and the assisting power value (50 kW) calculated based on the regenerative power, and determines the final command value to the motor generator 13.

More specifically, when the upper turning body 3 in being turned and driven is braked, all of the return hydraulic oil from the hydraulic actuator 17 (turning device 4) is made to flow into the hydraulic regenerative motor 18 without being limited by the regeneration control calculation unit 15d, and the electric power of 50 kW is generated by the regenerative generator 19. Then, this electric power generated by the regenerative generator 19 is supplied to the motor generator 13 through the second and first inverters 19a, 14a, and engine assist of 50 kW is performed by this motor generator 13.

At this time, in a state before the engine is assisted by the regenerative power of the return hydraulic oil from the hydraulic actuator 17 (before start of regeneration), the engine is assisted by supply of the electric power of 10 kW from the capacitor 14, however, in a state the engine is assisted by the regenerative power of the return hydraulic oil from the hydraulic actuator 17 (at the time of performing regeneration), there is no engine assist of 10 kW by the capacitor 14, and the assisting amount for the engine 11 out of the regenerative power becomes 40 kW (50 kW-10 kW). Accordingly, because drive of the engine 11 is assisted by this assisting amount, drive of the engine 11 can be lowered to 20 kW.

Also, at the time of performing regeneration, by reducing the discharge amount from the capacitor 14 according to the generation amount of the regenerative generator 19, the electric power outputted from this capacitor 14 can be reduced. Particularly, when the generation amount of the regenerative generator 19 becomes greater than the output electric power from the capacitor 14, this output of the electric power from the capacitor 14 is stopped to be 0 kW.

Next, the motion described above will be explained along the time series. FIG. 16 is graphs showing the motion in a case the engine is assisted by the electric power charged to the capacitor 14 of a hydraulic excavator related to the fourth embodiment of the present invention; wherein (a) is the regenerative power, (b) is the pump output, (c) is the engine power, (d) is the assisting power, and (e) is the capacitor charge/discharge electric power (+ is discharging, − is charging).

First, if regeneration of the energy by the return hydraulic oil from the hydraulic actuator 17 is started at the time ts, as shown in FIG. 16 (a), until the time t1 when the regenerative power regenerated by the regenerative generator 19 becomes 10 kW, all of this regenerative power regenerated by the regenerative generator 19 is supplied to the motor generator 13 through the second and first inverters 19a, 14a. Also, at the same time, as shown in FIG. 16 (e), supply of the electric power from the capacitor 14 to the motor generator 13 is gradually reduced according to the increase of the electric power generated by this regenerative generator 19. Further, at the time t1 when the regenerative power regenerated by the hydraulic regenerative motor 18 becomes the output supplied from the capacitor 14 to the motor generator 13 beforehand (10 kW), supply of this electric power from the capacitor 14 is stopped and becomes 0.

Further, from the time t1 until the time t2 when the electric power generated by the regenerative generator 19 lowers to 10 kW, similarly to the first embodiment described above, as shown in FIG. 16 (d), all of this electric power generated by the regenerative generator 19 is supplied to the motor generator 13. Then, as shown in FIG. 16 (c), the power of the engine 11 changes according to this electric power supplied to the motor generator 13.

Next, from the time t2 when the electric power generated by the regenerative generator 19 becomes equal to or less than the output supplied from the capacitor 14 to the motor generator 13 beforehand (10 kW) until the time te, the electric power supplied to the capacitor 14 is gradually increased in conjunction with reduction of the electric power generated by the regenerative generator 19 so that the assisting power for the engine 11 is maintained at 10 kW. Further, at the time te when the regenerative power regenerated by the regenerative generator 19 becomes 0, the electric power supplied to the capacitor 14 is made 10 kW and the electric power to the motor generator 13 is covered by the capacitor 14 which are similar to before the time ts.

<Action and Effect>

Therefore, according to the fourth embodiment described above, in a situation the electric power generated by the regenerative generator 19 gradually changes, and when this electric power is equal to or less than 10 kW which is the discharge amount of the capacitor 14 at the time of non-regeneration, all of this electric power is supplied to the motor generator 13, while the supply electric power to the capacitor 14 supplied to this motor generator 13 is gradually reduced, and the assisting power for the engine 11 is not changed. Also, when the electric power generated by the regenerative generator 19 exceeds 10 kW, the assisting power for the engine 11 is increased, the engine power is lowered, and engine assist is performed. Accordingly, because discharging from the capacitor 14 to the motor generator 13 can be preferentially suppressed, the discharging amount and the frequency of discharging of this capacitor 14 can be reduced, therefore the usable period of this capacitor 14 can be made longer, and the life can be extended.

More specifically, when the return hydraulic oil from the hydraulic actuator 17 is generated and this return hydraulic oil is made to flow into the hydraulic regenerative motor 18 in a state the electric power is supplied from the capacitor 14 to the motor generator 13, the electric power supplied from the capacitor 14 to the motor generator 13 is controlled according to the regenerative power calculated by the regenerative power calculation unit 15c. Accordingly, because the supply amount of the electric power from the capacitor 14 to the motor generator 13 can be properly suppressed corresponding to the regenerative power the return hydraulic oil from the hydraulic actuator 17 has, deterioration of this capacitor 14 accompanying charging and discharging can be prevented properly.

[Others]

Also, the present invention is not limited to the embodiments described above, and various modifications are included therein. For example, the embodiments described above were explained to facilitate understanding of the present invention, and the present invention is not necessarily limited to those including all the configurations explained above.

Further, although explanation was made without considering the energy loss of each device in each embodiment described above, control considering the energy loss of each device is preferable.

Furthermore, although the hydraulic excavator 1 having the front working machine 8 and the turning device 4 was explained in each embodiment described above, the present invention is not limited to it, and can also be used correspondingly to the construction machinery such as a wheel loader, wheel excavator, and dump truck for example having the hydraulic actuator 17 that recovers various potential energy and kinetic energy and can reutilize them as the regenerative power. Further, it is also possible to be configured to recover the potential energy at the time of the arm lowering motion in addition to that in the boom lowering motion of the hydraulic excavator 1, and to drive the motor generator 13 to assist the engine.

REFERENCE SIGNS LIST

1: Hydraulic excavator (construction machinery)
2: Lower traveling body
2a: Traveling device (fluid pressure drive device)
3: Upper turning body
4: Turning device (fluid pressure drive device)
5: Boom
5a: Boom cylinder (fluid pressure drive device)
6: Arm
6a: Arm cylinder (fluid pressure drive device)
7: Bucket
7a: Bucket cylinder (fluid pressure drive device)
8: Front working machine
10, 10A: Hydraulic drive control device
11: Engine (drive source)
11a: Rotational speed sensor
11b: Governor
11c: Drive shaft
12: Hydraulic pump (fluid pressure pump)
12a: Swash plate
12b: First regulator
12c: First electromagnetic proportional valve
12d: Discharge pressure sensor (discharge pressure detection device)
12e: Flow meter
12f: Tilting angle sensor
13: Motor generator
14: Capacitor (electrical storage device)
14a: First inverter
14b: Current sensor
14c: Voltage sensor
14d: Temperature sensor
15: Controller (control device)
15a: Electrical storage remaining amount calculation unit
15b: Pump output calculation unit
15c: Regenerative power calculation unit (energy calculation unit)
15d: Regeneration control calculation unit
16: Valve device
17: Hydraulic actuator (fluid pressure drive device)
18: Hydraulic regenerative motor (fluid pressure motor)
18a: Swash plate
18b: Second regulator
18c: Second electromagnetic proportional valve
18d: Pressure sensor
18e: Flow meter (flow rate detection device)
18f: Tilting angle sensor
19: Regenerative generator (generator)
19a: Second inverter
21: Hydraulic oil tank
21a: Flow meter
31: Converter
50: Flow dividing valve (flow rate control device)

The invention claimed is:

1. Construction machinery, comprising:
 a drive source;
 a fluid pressure pump driven by the drive source;
 a fluid pressure drive device driven by fluid discharged from the fluid pressure pump;
 a discharge pressure detection device that detects the discharge pressure from the fluid pressure pump;
 a fluid pressure motor driven by a return fluid from the fluid pressure drive device;
 a valve device that controls a flow rate of hydraulic oil discharged from the fluid pressure pump and supplied to the fluid pressure drive device;
 a first pipeline that allows the return fluid from the fluid pressure drive device to flow out from the valve device to the fluid pressure motor;
 a generator driven by power of the fluid pressure motor and generates electric power;
 a motor generator that assists drive of the drive source by electric power supplied from the generator;
 at least one or more flow rate detection device that is provided in the first pipeline and detects the flow rate of the return fluid flowing out to the fluid pressure motor from the fluid pressure drive device;
 a second pipeline that branches from the first pipeline and allows the return fluid from the fluid pressure drive device to flow out to a tank;
 a flow dividing valve that is provided in the second pipeline and controls the flow rate of the return fluid from the fluid pressure drive device; and
 a controller that controls the flow rate of fluid flowing into the fluid pressure motor by controlling the flow dividing valve based on the discharge pressure detected by the discharge pressure detection device and the flow rate detected by the flow rate detection device.

2. The construction machinery according to claim 1, wherein
 the control device includes: an energy calculation unit that calculates energy of the return fluid based on the flow rate of the fluid detected by the flow rate detection device; a pump output calculation unit that calculates the output of the fluid pressure pump outputted from the fluid pressure pump based on a detection value from the discharge pressure detection device; and a regeneration control calculation unit that calculates a command signal that controls the flow dividing valve according to comparison between difference between the output of the fluid pressure pump calculated by the pump output calculation unit and the energy calculated by the energy calculation unit and a predetermined first threshold value set beforehand.

3. The construction machinery according to claim 2, wherein
 when the difference between the output of the fluid pressure pump calculated by the pump output calculation unit and the energy calculated by the energy calculation unit is equal to or greater than the first threshold value, the control unit controls the flow dividing valve so that all of the return fluid from the fluid pressure drive device flows into the fluid pressure motor based on the command signal calculated by the regeneration control calculation unit, and the control unit supplies the electric power generated by the generator to the motor generator.

4. The construction machinery according to claim 2, further comprising:

an electrical storage device that is electrically connected to the motor generator and the generator, is supplied with the electric power generated by the generator, and stores the electric power, wherein the control device includes an electrical storage remaining amount calculation unit that calculates the electrical storage remaining amount of the electrical storage device, and, when the difference between the output of the fluid pressure pump calculated by the pump output calculation unit and the energy calculated by the energy calculation unit is less than the first threshold value and the electrical storage remaining amount calculated by the electrical storage remaining amount calculation unit is less than a predetermined set value, the control device: controls the flow dividing valve so that all of the return fluid from the fluid pressure drive device flows into the fluid pressure motor based on the command signal calculated by the regeneration control calculation unit; supplies the electric power corresponding to the output of the fluid pressure pump calculated by the pump output calculation unit out of the electric power generated by the generator to the motor generator;

and supplies the remaining electric power to the electrical storage device.

5. The construction machinery according to claim 2, further comprising:

an electrical storage device that is electrically connected to the motor generator and the generator, is supplied with the electric power generated by the generator, and stores the electric power, wherein when the difference between the output of the fluid pressure pump calculated by the pump output calculation unit and the energy calculated by the energy calculation unit is less than the first threshold value and the electrical storage remaining amount calculated by the electrical storage remaining amount calculation unit is equal to or greater than the set value, the control device makes the flow dividing valve control the flow rate of the fluid flowing in to the fluid pressure motor so that the electric power generated by the generator becomes equal to or less than the power corresponding to the output portion of the fluid pressure pump calculated by the pump output calculation unit based on the command signal calculated by the regeneration control calculation unit, and the control device supplies the electric power generated by the generator to the motor generator.

6. The construction machinery according to claim 3, wherein when the return fluid from the fluid pressure drive device is made to flow into the fluid pressure motor in a state electric power is supplied from the electrical storage device to the motor generator, the control device controls the electric power supplied from the electrical storage device to the motor generator according to the energy calculated by the energy calculation unit.

7. The construction machinery according to claim 2, further comprising:

an electrical storage device that is electrically connected to the motor generator and the generator, is supplied with the electric power generated by the generator, and stores the electric power, wherein the drive source is an engine, and the control device: includes an electrical storage remaining amount calculation unit that calculates the electrical storage remaining amount of the electrical storage device; controls the power of the engine according to the rotational speed of the engine; stops supply of the electric power to the motor generator when the rotational speed of the engine becomes equal to or greater than a predetermined second threshold value in a state the electric power generated by the generator is supplied to the motor generator; and controls the flow dividing valve so as to stop inflow of the return fluid from the fluid pressure drive device into the fluid pressure motor based on the command signal calculated by the regeneration control calculation unit when the electrical storage remaining amount calculated by the electrical storage remaining amount calculation unit is less than a predetermined set value.

8. The construction machinery according to claim 1, wherein the drive source is an engine, and the control device: stores efficiency characteristics with respect to the power of the engine beforehand; calculates a target rotational speed of the engine according to the efficiency characteristics; calculates a correction value of the power of the engine based on the pump output calculated by the pump output calculation unit and the regenerative power calculated by the energy calculation unit in a state the electric power generated by the generator is supplied to the motor generator; and corrects the target rotational speed of the engine based on the correction value of the power of the engine.

9. The construction machinery according to claim 2, wherein the drive source is an engine, and the control device: stores efficiency characteristics with respect to the power of the engine beforehand; calculates a target rotational speed of the engine according to the efficiency characteristics; calculates a correction value of the power of the engine based on the pump output calculated by the pump output calculation unit and the regenerative power calculated by the energy calculation unit in a state the electric power generated by the generator is supplied to the motor generator; and corrects the target rotational speed of the engine based on the correction value of the power of the engine.

10. The construction machinery according to claim 4, wherein when the return fluid from the fluid pressure drive device is made to flow into the fluid pressure motor in a state electric power is supplied from the electrical storage device to the motor generator, the control device controls the electric power supplied from the electrical storage device to the motor generator according to the energy calculated by the energy calculation unit.

11. The construction machinery according to claim 5, wherein when the return fluid from the fluid pressure drive device is made to flow into the fluid pressure motor in a state electric power is supplied from the electrical storage device to the motor generator, the control device controls the electric power supplied from the electrical storage device to the motor generator according to the energy calculated by the energy calculation unit.

* * * * *